US012697273B2

(12) United States Patent
Giacometti

(10) Patent No.: US 12,697,273 B2
(45) Date of Patent: Aug. 4, 2026

(54) DUAL SENSOR IMPLEMENTATIONS FOR PROVIDING RESUSCITATIVE CHEST COMPRESSION FEEDBACK

(71) Applicant: ZOLL Medical Corporation, Chelmsford, MA (US)

(72) Inventor: Paolo Giacometti, North Grafton, MA (US)

(73) Assignee: ZOLL Medical Corporation, Chelmsford, MA (US)

( * ) Notice: Subject to any disclaimer, the term of this patent is extended or adjusted under 35 U.S.C. 154(b) by 736 days.

(21) Appl. No.: 17/158,411

(22) Filed: Jan. 26, 2021

(65) Prior Publication Data

US 2021/0228441 A1 Jul. 29, 2021

Related U.S. Application Data

(60) Provisional application No. 62/966,089, filed on Jan. 27, 2020.

(51) Int. Cl.
*A61H 31/00* (2006.01)

(52) U.S. Cl.
CPC ......... *A61H 31/005* (2013.01); *A61H 31/007* (2013.01); *A61H 2230/04* (2013.01)

(58) Field of Classification Search
CPC .................. A61H 31/00; A61H 31/005; A61H 2031/002; A61H 2201/5061;
(Continued)

(56) References Cited

U.S. PATENT DOCUMENTS 4,059,099 A 11/1977 Davis
4,088,138 A 5/1978 Diack et al.
(Continued)

FOREIGN PATENT DOCUMENTS

EP 1057451 A2 12/2000
EP 1079310 A2 2/2001
(Continued)

OTHER PUBLICATIONS

Kovacs; "Rotation about an arbitrary axis and reflection through an arbitrary plane"; Annales Mathematicae et Informaticae; 2012; pp. 175-186; vol. 40.

*Primary Examiner* — Margaret M Luarca
*Assistant Examiner* — Sarah B Lederer
(74) *Attorney, Agent, or Firm* — The Webb Law Firm

(57) ABSTRACT

A system for assisting a user in providing chest compressions to a patient includes: a first motion sensor configured for measuring motion of a first region of a thorax of the patient; and a first housing physically coupled with the first motion sensor. The first housing includes: a first frame for holding the first motion sensor in place, and a textured padding for receiving at least a portion of at least one hand of the user during chest compressions. The textured padding covers the first frame and the first motion sensor. The textured padding comprises an exterior having a plurality of raised surface features. The system also includes: a second motion sensor configured for measuring motion of a second region of the thorax of the patient; and a second housing physically coupled with the second motion sensor and having a second frame for holding the first motion sensor in place.

27 Claims, 18 Drawing Sheets

(58) Field of Classification Search
CPC .... A61H 2201/5084; A61H 2201/5097; A61H 31/007; A61H 2230/04; A61N 1/00; A61N 1/046; A61N 1/0484; A61N 1/3937
See application file for complete search history.

(56) References Cited

U.S. PATENT DOCUMENTS 4,196,722 A * 4/1980 Vanderwoude ...... A61H 31/007 601/41
4,198,963 A 4/1980 Barkalow et al.
RE30,372 E 8/1980 Mirowski et al.
4,273,114 A 6/1981 Barkalow et al.
4,296,755 A 10/1981 Judell
4,355,634 A 10/1982 Kanter
4,588,383 A 5/1986 Parker et al.
4,610,254 A 9/1986 Morgan et al.
4,619,265 A 10/1986 Morgan et al.
4,680,708 A 7/1987 Ambos et al.
4,781,200 A 11/1988 Baker
4,928,674 A 5/1990 Halperin et al.
4,930,517 A 6/1990 Cohen et al.
4,947,857 A 8/1990 Albert et al.
4,987,783 A 1/1991 D'Antonio et al.
5,077,667 A 12/1991 Brown et al.
5,092,341 A 3/1992 Kelen
5,109,862 A 5/1992 Kelen et al.
5,247,945 A 9/1993 Heinze et al.
5,262,958 A 11/1993 Chui et al.
5,285,792 A 2/1994 Sjoquist et al.
5,330,526 A 7/1994 Fincke et al.
RE34,800 E 11/1994 Hutchins
5,365,426 A 11/1994 Siegel et al.
5,391,187 A 2/1995 Freeman
5,402,520 A 3/1995 Schnitta
5,421,342 A 6/1995 Mortara
5,439,483 A 8/1995 Duong-Van
5,454,779 A 10/1995 Lurie et al.
5,466,244 A 11/1995 Morgan
5,471,991 A 12/1995 Shinnar
5,474,574 A 12/1995 Payne et al.
5,496,257 A 3/1996 Kelly
5,511,553 A 4/1996 Segalowitz
5,513,649 A 5/1996 Gevins et al.
5,555,889 A 9/1996 Karagueuzian et al.
5,562,710 A 10/1996 Olsen et al.
5,589,639 A 12/1996 D'Antonio et al.
5,591,213 A 1/1997 Morgan
5,611,815 A 3/1997 Cole et al.
5,617,853 A 4/1997 Morgan
5,619,265 A 4/1997 Suzuki et al.
5,645,571 A 7/1997 Olson et al.
5,662,690 A 9/1997 Cole et al.
5,674,253 A 10/1997 Adams et al.
5,683,424 A 11/1997 Brown et al.
5,700,281 A 12/1997 Brewer et al.
5,704,365 A 1/1998 Albrecht et al.
5,735,879 A 4/1998 Gliner et al.
5,738,637 A 4/1998 Kelly et al.
5,755,671 A 5/1998 Albrecht et al.
5,772,604 A 6/1998 Langberg et al.
5,782,888 A 7/1998 Sun et al.
5,831,164 A 11/1998 Reddi et al.
5,876,350 A 3/1999 Lo et al.
5,957,856 A 9/1999 Weil et al.
5,967,995 A 10/1999 Shusterman et al.
5,978,693 A 11/1999 Hamilton et al.
5,999,852 A 12/1999 Elabbady et al.
6,016,445 A 1/2000 Baura
6,125,298 A 9/2000 Olson et al.
6,125,299 A 9/2000 Groenke et al.
6,171,257 B1 1/2001 Weil et al.
6,171,267 B1 1/2001 Baldwin, II
6,174,295 B1 1/2001 Cantrell et al.
6,178,357 B1 1/2001 Gliner et al.
6,188,928 B1 2/2001 Noren et al.
6,224,562 B1 5/2001 Lurie et al.
6,246,907 B1 6/2001 Lin et al.
6,263,238 B1 7/2001 Brewer et al.
6,289,243 B1 9/2001 Lin et al.
6,306,107 B1 10/2001 Myklebust et al.
6,308,094 B1 10/2001 Shusterman et al.
6,309,695 B1 10/2001 Singh
6,344,623 B1 2/2002 Yamazaki et al.
6,351,671 B1 2/2002 Myklebust et al.
6,360,125 B1 3/2002 Weil et al.
6,360,602 B1 3/2002 Tazartes et al.
6,390,996 B1 5/2002 Halperin et al.
6,393,316 B1 5/2002 Gillberg et al.
6,411,843 B1 6/2002 Zarychta
6,418,342 B1 7/2002 Owen et al.
6,427,685 B1 8/2002 Ray, II
6,438,419 B1 8/2002 Callaway et al.
6,453,272 B1 9/2002 Slechta
6,480,734 B1 11/2002 Zhang et al.
6,496,731 B1 12/2002 Lovett
6,597,943 B2 7/2003 Taha et al.
6,599,258 B1 7/2003 Bystrom et al.
6,622,036 B1 9/2003 Suffin
6,622,042 B1 9/2003 Thacker
6,658,290 B1 12/2003 Lin et al.
6,671,545 B2 12/2003 Fincke
6,687,540 B2 2/2004 Marcovecchio
6,697,671 B1 2/2004 Nova et al.
6,807,442 B1 10/2004 Myklebust et al.
6,827,695 B2 12/2004 Palazzolo et al.
6,961,612 B2 11/2005 Elghazzawi et al.
6,990,373 B2 1/2006 Jayne et al.
6,993,386 B2 1/2006 Lin et al.
7,006,865 B1 2/2006 Cohen et al.
7,013,176 B2 3/2006 Ding et al.
7,032,596 B2 4/2006 Thompson et al.
7,085,601 B1 8/2006 Bardy et al.
7,089,055 B2 8/2006 Cates et al.
7,220,235 B2 5/2007 Geheb et al.
7,463,922 B1 12/2008 Snyder et al.
7,488,293 B2 2/2009 Marcovecchio et al.
7,565,194 B2 7/2009 Tan et al.
7,708,683 B2 5/2010 Hadley
7,831,299 B2 11/2010 Tan et al.
8,165,671 B2 4/2012 Freeman et al.
8,951,213 B2 2/2015 Butler et al.
9,125,793 B2 9/2015 Palazzolo et al.
9,289,134 B2 3/2016 Tan et al.
9,545,359 B2 1/2017 Freeman et al.
2001/0018562 A1 8/2001 Sherman et al.
2001/0047140 A1 11/2001 Freeman
2002/0026131 A1 2/2002 Halperin
2002/0055694 A1 5/2002 Halperin et al.
2002/0133197 A1 9/2002 Snyder et al.
2002/0165471 A1 11/2002 Halperin et al.
2002/0165585 A1 11/2002 Dupelle et al.
2002/0193711 A1 12/2002 Halperin et al.
2003/0023277 A1 1/2003 Owen et al.
2003/0055460 A1 3/2003 Owen et al.
2003/0055477 A1 3/2003 Dupelle et al.
2003/0083586 A1 5/2003 Ferek-Petric
2003/0083699 A1 5/2003 Hamilton et al.
2003/0088285 A1 5/2003 Marcovecchio et al.
2003/0130697 A1 7/2003 Halperin et al.
2003/0144699 A1 7/2003 Freeman
2003/0171661 A1 9/2003 Tong
2003/0195567 A1 10/2003 Jayne et al.
2004/0049234 A1 3/2004 Morgan et al.
2004/0059237 A1 3/2004 Narayan et al.
2004/0162585 A1 8/2004 Elghazzawi et al.
2004/0171954 A1 9/2004 Holman
2004/0210172 A1 10/2004 Palazzolo et al.
2004/0215244 A1 10/2004 Marcovecchio et al.
2004/0267324 A1 12/2004 Geheb et al.
2005/0021094 A1 1/2005 Ostroff et al.
2005/0027317 A1 2/2005 Langer
2005/0070964 A1 3/2005 Hansen et al.
2005/0209525 A1 9/2005 Bojovic et al.
2006/0036292 A1 2/2006 Smith

(56) References Cited

U.S. PATENT DOCUMENTS

2006/0122648 A1 6/2006 Elghazzawi et al.
2006/0129190 A1 6/2006 Sullivan et al.
2006/0129191 A1 6/2006 Sullivan et al.
2006/0136000 A1 6/2006 Bowers
2006/0155336 A1 7/2006 Heath
2006/0173498 A1 8/2006 Banville et al.
2006/0173499 A1 8/2006 Hampton et al.
2006/0173500 A1 8/2006 Walker et al.
2006/0173501 A1 8/2006 Stickney et al.
2006/0206152 A1 9/2006 Covey et al.
2006/0229679 A1 10/2006 Joo
2006/0259080 A1 11/2006 Vaisnys et al.
2007/0032829 A1 2/2007 Ostroff
2007/0179539 A1 8/2007 Degroot et al.
2007/0219588 A1 9/2007 Freeman
2007/0233197 A1 10/2007 Jung et al.
2008/0009908 A1 1/2008 Parascandola et al.
2008/0015645 A1 1/2008 Kelly et al.
2008/0033494 A1 2/2008 Swerdlow
2008/0033495 A1 2/2008 Kumar
2008/0046015 A1 2/2008 Freeman et al.
2009/0029332 A1 1/2009 Solosko et al.
2010/0022904 A1 1/2010 Centen
2010/0071705 A1* 3/2010 Alviso .................. A61F 5/0118
128/845
2012/0010543 A1 1/2012 Johnson et al.
2012/0083720 A1 4/2012 Centen et al.
2012/0146797 A1 6/2012 Oskin et al.
2013/0023781 A1 1/2013 Freeman et al.
2013/0060173 A1 3/2013 Palazzolo et al.
2013/0102936 A1 4/2013 Halsne et al.
2014/0081100 A1 3/2014 Muhsin et al.
2014/0277226 A1 9/2014 Poore et al.
2014/0288450 A1 9/2014 Freeman et al.
2014/0323928 A1 10/2014 Johnson
2015/0018695 A1 1/2015 Tan et al.
2015/0018823 A1 1/2015 Centen
2015/0094782 A1 4/2015 Prew et al.
2016/0279405 A1 9/2016 Riley et al.
2017/0106183 A1* 4/2017 Silver .................... A61N 1/046

FOREIGN PATENT DOCUMENTS

GB 2314648 A 1/1998
JP 2001104259 A 4/2001
WO 9724062 A1 7/1997
WO 9830282 A1 7/1998
WO 9924114 A1 5/1999
WO 9925306 A1 5/1999
WO 0027464 A2 5/2000
WO 0215836 A2 2/2002
WO 2004054656 A1 7/2004
WO 2005021089 A1 3/2005

* cited by examiner

DUAL SENSOR IMPLEMENTATIONS FOR PROVIDING RESUSCITATIVE CHEST COMPRESSION FEEDBACK

CROSS REFERENCE TO RELATED APPLICATIONS

This application claims priority to U.S. Provisional Patent Application Ser. No. 62/966,089, entitled "Dual Sensor Implementations for Providing Resuscitative Chest Compression Feedback", filed Jan. 27, 2020, the entire contents of which are incorporated herein by reference.

BACKGROUND

Field

The present disclosure is related to cardiac resuscitation and, more specifically, to systems and techniques for assisting rescuers in performing cardio-pulmonary resuscitation.

Description of Related Art

Defibrillators are commonly used to treat Sudden Cardiac Arrest by applying a defibrillating shock to the heart of a cardiac arrest patient via electrodes placed on the chest of the patient. The ECG signal of a cardiac arrest patient, properly measured and analyzed, provides a strong indication of whether the patient's heart is exhibiting a shockable rhythm or a non-shockable rhythm. A shockable rhythm refers to an aberrant ECG signal where a defibrillation shock is advised for restoration of a normal heartbeat, while a non-shockable rhythm refers to an ECG signal where a defibrillation shock is not advised. Ventricular fibrillation, for example, is a shockable rhythm, while pulseless electrical activity is an example of a non-shockable rhythm. Defibrillators are also capable of treating other dysrhythmias (irregular heartbeats), such as atrial fibrillation, bradycardia, and tachycardia. An ECG signal may be obtained through electrodes placed on the chest of the patient, and the defibrillating or cardioverting shock may be applied through the same electrodes.

During resuscitation, treatment protocols recommended by the American Heart Association and European Resuscitation Council advise for the rescuer to regularly check the patient's pulse or to evaluate the patient for signs of circulation. If no pulse or signs of circulation are present, the rescuer may be often instructed to perform CPR on the victim for an appropriate period of time between shock analyses, where CPR involves applying both chest compressions and ventilations to the victim. Chest compressions and/or ventilations may be monitored during the course of CPR, for example, through systems and technologies that incorporate real-time CPR feedback (e.g., REAL CPR HELP® marketed by ZOLL® Medical Corporation) and which may implement resuscitation assemblies (e.g., CPR-D-PADZ®, CPR STAT-PADZ© marketed by ZOLL® Medical Corporation) having a sensor for obtaining CPR related information for manual CPR providers. For example, ZOLL's CPR-D-PADZ© and CPR STAT-PADZ© include a pair of electrode pads and a single chest compression sensor.

SUMMARY

The system and methods disclosed in the present disclosure advantageously improves chest compression sensor measurement accuracy and functionality, and allows for flexible pad designs that provide for more enhanced usability than have otherwise been available in the past. The present disclosure provides a system that includes a pair of motion sensors where the pair of motion sensors are incorporated into a streamlined, low-profile design where at least one of the motion sensors is covered with a padding having a textured surface. This allows for a sensor system that is easy to use by the rescuer while also providing a comfortable, slip resistant surface upon which the rescuer can deliver chest compressions. The textured surface may also have a mechanical structure that is arranged so as to intrinsically provide tactile feedback that encourages or otherwise assists a user to position the hands/fingers in a manner desirable for administering chest compressions (e.g., placing the fingers or thumbs in a balanced position around the center of the sensor housing).

According to one aspect of the present disclosure, provided is a system for assisting a user in providing chest compressions to a patient. The system comprises: a first motion sensor configured for measuring motion of a first region of a thorax of the patient; and a first housing physically coupled with the first motion sensor. The first housing comprises: a first frame for holding the first motion sensor in place, and a textured padding for receiving at least a portion of at least one hand of the user during chest compressions. The textured padding covers the first frame and the first motion sensor. The textured padding comprises an exterior having a plurality of raised surface features. The system also comprises: a second motion sensor configured for measuring motion of a second region of the thorax of the patient; and a second housing physically coupled with the second motion sensor and comprising a second frame for holding the second motion sensor in place.

The textured padding may be configured to provide tactile feedback for the user as to where the hands of the user are positioned or oriented relative to the first housing. In addition, the textured padding may be configured to provide a slip resistant surface that enhances comfort for the user when providing chest compressions to the patient. In one example, the plurality of raised surface features may comprise a plurality of protrusions extending outwardly from the exterior of the textured padding. The plurality of protrusions may comprise at least four protrusions extending outwardly from the exterior of the textured padding. The plurality of protrusions may be arranged according to a concentric pattern. In some examples, the plurality of protrusions may have an average height per protrusion of between about 0.005 inches and about 0.1 inches (e.g., average height per protrusion of between about 0.0075 inches and about 0.025 inches). The plurality of protrusions may cover an average area per protrusion of between about 0.0001 square inches and about 0.01 square inches (e.g., average area per protrusion of between about 0.0005 square inches and about 0.002 square inches).

In some examples, the first frame may comprise a thermoplastic polymeric material comprising at least one of: polycarbonate, polypropylene, polystyrene, polyethylene, ABS, nylon, silicone, elastomer, neoprene, santoprene, and polyurethane. The polymeric material may exhibit a Shore OO durometer of between 60 and 100 (e.g., between 70 and 90, between 75 and 90), a Shore A durometer of between 20 and 100 (e.g., between 20 and 50, between 25 and 45), or a Shore D durometer of between 1 and 60 (e.g., between 1 and 20, between 5 and 15, between 5 and 10), and/or a Young's modulus of between 1 MPa and 20 MPa (e.g., 1-10 MPa, 1-5 MPa, 1-2 MPa). The textured padding may comprise an upper surface and a lower surface with a thickness between the upper surface and the lower surface of between about 0.1 inches and about 2.5 inches. When used with pediatric patients, the textured padding may comprise a substantially circular shape. The first frame may also comprise a substantially circular shape having a radius smaller than a radius of the textured padding. The radius of the textured padding may be between about 0.5 inches and about 2.0 inches (e.g., between 0.75 inches and 2.0 inches). The textured padding may comprise an overmold encasing the first frame and the first motion sensor. In addition, the textured padding may comprise a central region designated by a cross-shaped marking. The first frame may be more rigid than the textured padding. The textured padding may comprise a thermoplastic polymeric material including one or more of: polycarbonate, polypropylene, polystyrene, polyethylene, ABS, nylon, silicone, elastomer, neoprene, santoprene, polyurethane, or another suitable material. The textured padding may exhibit a Shore 00 durometer of between 60 and 100 (e.g., between 70 and 90, between 75 and 90), a Shore A durometer of between 20 and 100 (e.g., between 20 and 50, between 25 and 45), or a Shore D durometer of between 1 and 60 (e.g., between 1 and 20, between 5 and 15, between 5 and 10), and/or a Young's modulus of between 1 MPa and 20 MPa (e.g., 1-10 MPa, 1-5 MPa, 1-2 MPa).

In certain examples, the first frame may comprise a first receptacle for receiving the first motion sensor, and the second frame comprises a second receptacle for receiving the second motion sensor. In addition, the system may further comprise a first adhesive material located within the first receptacle for adhering the first motion sensor and the first frame, and a second adhesive material located within the second receptacle for adhering the second motion sensor and the second frame. The adhesive may provide an additional function for protecting the electronics mechanically and electrically (e.g., protection from electrostatic discharge and/or electromagnetic interference). The system may also further comprise a connector and a cable for providing electrical communication between the first and second motion sensors and a computing device. The computing device may comprise at least one of: a patient monitor, a defibrillator, and a mobile computing device. In addition, the first receptacle may be configured to receive a first portion of the cable, and the second receptacle may be configured to receive a second portion of the cable.

In some examples, the first region may comprise an anterior portion of the thorax of the patient, and the second region may comprise a posterior portion of the thorax of the patient. The first motion sensor may comprise a first accelerometer and the second motion sensor may comprise a second accelerometer.

In one example, at least one processor and memory may be communicatively coupled with the first motion sensor and the second motion sensor. The at least one processor and memory may be configured to: receive and process signals from the first motion sensor and the second motion sensor to estimate compression depth during administration of chest compressions by the user. The system may also further comprise an output device configured to provide chest compression feedback for the user. The at least one processor and memory may be further configured to: compare the estimated compression depth to a desired compression depth range; and cause the output device to provide an indication of the estimated compression depth and provide the chest compression feedback for the user.

In another example, the system may further comprise a first electrode configured to be adhered to the first sensor, and a second electrode configured to be adhered to the second sensor. The first and second electrodes may be configured to measure ECG signals of the patient and/or to provide a defibrillation shock to the patient.

When used with pediatric patients, the textured padding may comprise a substantially circular shape. Such a shape may be preferable for applying a variety of chest compression techniques for pediatric patients, in particular for example, two thumbs encircling hands, two fingers, and single palm techniques. Alternatively, when used with adult patients, the textured padding may comprise an oval shape. Similarly, this shape may be preferable for applying various chest compression techniques for adult patients, for example, single palm and two hand techniques. The first frame may comprise a substantially circular shape. As discussed further below, such a frame shape may be suitable for both pediatric and adult sensors (where the overmold shape differs; pediatric being circular and the adult being oval in shape); for example, in the adult compression situation, the frame may provide a relatively rigid central portion so that the motion sensor is able to provide accurate measures of compression depth, while also having relatively flexible surroundings to accommodate the topography of varying chest surfaces. In some examples, the first motion sensor may be positioned at a center of the first housing.

According to another aspect of the present disclosure, provided is a system for assisting a user in providing chest compressions to a patient. The system comprises: a first motion sensor configured for measuring motion of a first region of a thorax of the patient; and a first housing physically coupled with the first motion sensor. The first housing comprises: a first frame for holding the first motion sensor in place, and a padding for receiving at least a portion of at least one hand of the user during chest compressions. The padding covers the first frame and the first motion sensor. The padding has an upper surface and a lower surface with a thickness between the upper surface and the lower surface of between about 0.1 inches and about 2.5 inches. The system also comprises: a second motion sensor configured for measuring motion of a second region of the thorax of the patient; and a second housing physically coupled with the second motion sensor and comprising a second frame for holding the second motion sensor in place.

In one example, the padding may comprise a textured exterior having a plurality of raised surface features. The plurality of raised surface features may comprise a plurality of protrusions extending from the textured exterior of the padding. The plurality of protrusions may be arranged according to a concentric pattern. The padding may also comprise central region designated by a cross-shaped marking. Such a marking may be preferable so as to assist in properly aligning the sensor to the patient's sternal midline and nipple line during compressions, using the center of the cross as the origin of three-dimensional (along X-Y-Z axes) motion during chest compressions.

When used with a pediatric patient, the padding may comprise a substantially circular shape. The first frame may comprise a substantially circular shape having a radius smaller than a radius of the padding. The radius of the padding may be between about 0.5 inches and about 2.5 inches (e.g., between 0.75-2.5 inches). When used with an adult patient, the textured padding may comprise an oval shape. The first motion sensor may be positioned at a center of the first housing.

In some examples, the padding may comprise an overmold encasing the first frame and the first motion sensor. The first frame may be more rigid than the padding. In other examples, the first frame may comprise a first receptacle for receiving the first motion sensor, and the second frame may comprise a second receptacle for receiving the second motion sensor. A first adhesive material may be located within the first receptacle for adhering the first motion sensor and the first frame, and a second adhesive material may be located within the second receptacle for adhering the second motion sensor and the second frame. The system may further comprise a connector and a cable for providing electrical communication between the first and second motion sensors and a computing device. The computing device may comprise at least one of: a patient monitor, a defibrillator, and a mobile computing device. The first receptacle may be configured to receive a first portion of the cable, and the second receptacle is configured to receive a second portion of the cable.

In some examples, the first region may comprise an anterior portion of the thorax of the patient, and the second region may comprise a posterior portion of the thorax of the patient. The first motion sensor may comprise a first accelerometer and the second motion sensor may comprise a second accelerometer.

The system may further comprise at least one processor and memory communicatively coupled with the first motion sensor and the second motion sensor. The at least one processor and memory may be configured to: receive and process signals from the first motion sensor and the second motion sensor to estimate compression depth during administration of chest compressions by the user. In some examples, the system may further comprise an output device configured to provide chest compression feedback for the user. The at least one processor and memory may be configured to: compare the estimated compression depth to a desired compression depth range, and cause the output device to provide an indication of the estimated compression depth and provide the chest compression feedback for the user.

In further examples, the system may further comprise a first electrode configured to be adhered to the first sensor, and a second electrode configured to be adhered to the second sensor. The first and second electrodes may be configured to measure ECG signals of the patient and/or provide a defibrillation shock to the patient. As discussed further below, such a physical coupling of the sensors to electrodes allows for the system to provide electrode placement feedback in various positions such as anterior-anterior (A-A), anterior-posterior (A-P), or lateral-lateral (L-L) positions.

Various aspects of the dual sensor implementations for providing resuscitative chest compression feedback are disclosed in one or more of the following numbered clauses:

Clause 1: A system for assisting a user in providing chest compressions to a patient, the system comprising: a first motion sensor configured for measuring motion of a first region of a thorax of the patient; a first housing physically coupled with the first motion sensor, the first housing comprising: a first frame for holding the first motion sensor in place, and a textured padding for receiving at least a portion of at least one hand of the user during chest compressions, the textured padding covering the first frame and the first motion sensor, the textured padding comprising an exterior having a plurality of raised surface features; a second motion sensor configured for measuring motion of a second region of the thorax of the patient; and a second housing physically coupled with the second motion sensor and comprising a second frame for holding the second motion sensor in place.

Clause 2: The system of clause 1, wherein the textured padding is configured to provide tactile feedback for the user as to where the hands of the user are positioned or oriented relative to the first housing.

Clause 3: The system of one of clauses 1 or 2, wherein the textured padding is configured to provide a slip resistant surface that enhances comfort for the user when providing chest compressions to the patient.

Clause 4: The system of any one of clauses 1-3, wherein the plurality of raised surface features comprise a plurality of protrusions extending outwardly from the exterior of the textured padding.

Clause 5: The system of clause 4, wherein the plurality of protrusions comprise at least four protrusions extending outwardly from the exterior of the textured padding.

Clause 6: The system of one of clauses 4 or 5, wherein the plurality of protrusions are arranged according to a concentric pattern.

Clause 7: The system of any one of clauses 4-6, wherein the plurality of protrusions have an average height per protrusion of between about 0.005 inches and about 0.1 inches.

Clause 8: The system of any one of clauses 4-7, wherein the plurality of protrusions cover an average area per protrusion of between about 0.0001 square inches and about 0.01 square inches.

Clause 9: The system of any one of clauses 1-8, wherein the first housing comprises a thermoplastic polymeric material comprising at least one of: polycarbonate, polypropylene, polystyrene, polyethylene, ABS, nylon, silicone, elastomer, neoprene, santoprene, polyurethane.

Clause 10: The system of clause 9, wherein the thermoplastic polymeric material has a Shore 00 durometer of between about 60 and about 100, a Shore A durometer of between about 20 and about 100, or a Shore D durometer of between about 1 and about 60.

Clause 11: The system of any one of clauses 1-10, wherein the textured padding comprises an upper surface and a lower surface with a thickness between the upper surface and the lower surface of between about 0.1 inches and about 2.5 inches.

Clause 12: The system of any one of clauses 1-11, wherein the textured padding comprises a substantially circular shape.

Clause 13: The system of clause 12, wherein the first frame comprises a substantially circular shape having a radius smaller than a radius of the textured padding.

Clause 14: The system of one of clauses 12 or 13, wherein the radius of the textured padding is between about 0.5 inches and about 2.0 inches.

Clause 15: The system of any one of clauses 1-14, wherein the textured padding comprises an overmold encasing the first frame and the first motion sensor.

Clause 16: The system of any one of clauses 1-15, wherein the textured padding comprises a central region designated by a cross-shaped marking.

Clause 17: The system of any one of clauses 1-16, wherein the first frame is more rigid than the textured padding.

Clause 18: The system of any one of clauses 1-17, wherein the first frame comprises a first receptacle for receiving the first motion sensor, and the second frame comprises a second receptacle for receiving the second motion sensor.

Clause 19: The system of clause 18, further comprising a first adhesive material located within the first receptacle for adhering the first motion sensor and the first frame, and a second adhesive material located within the second receptacle for adhering the second motion sensor and the second frame.

Clause 20: The system of one of clauses 18 or 19, further comprising a connector and a cable for providing electrical communication between the first and second motion sensors and a computing device.

Clause 21: The system of any one of clauses 18-20, wherein the computing device comprises at least one of: a patient monitor, a defibrillator, and a mobile computing device.

Clause 22: The system of any one of clauses 18-21, wherein the first receptacle is configured to receive a first portion of the cable, and the second receptacle is configured to receive a second portion of the cable.

Clause 23: The system of any one of clauses 1-22, wherein the first region comprises an anterior portion of the thorax of the patient, and the second region comprises a posterior portion of the thorax of the patient.

Clause 24: The system of any one of clauses 1-23, wherein the first motion sensor comprises a first accelerometer and the second motion sensor comprises a second accelerometer.

Clause 25: The system of any one of clauses 1-24, further comprising at least one processor and memory communicatively coupled with the first motion sensor and the second motion sensor, the at least one processor and memory configured to: receive and process signals from the first motion sensor and the second motion sensor to estimate compression depth during administration of chest compressions by the user.

Clause 26. The system of clause 25, further comprising an output device configured to provide chest compression feedback for the user, wherein the at least one processor and memory are configured to: compare the estimated compression depth to a desired compression depth range; and cause the output device to provide an indication of the estimated compression depth and provide the chest compression feedback for the user.

Clause 27: The system of any one of clauses 1-26, further comprising a first electrode configured to be adhered to the first sensor, and a second electrode configured to be adhered to the second sensor.

Clause 28: The system of clause 27, wherein the first and second electrodes are configured to measure ECG signals of the patient.

Clause 29: The system of one of clauses 27 or 28, wherein the first and second electrodes are configured to provide a defibrillation shock to the patient.

Clause 30: The system of any one of clauses 1-29, wherein the textured padding comprises an oval shape.

Clause 31: The system of clause 30, wherein the first frame comprises a substantially circular shape.

Clause 32: The system of any one of clauses 1-30, wherein the first motion sensor is positioned at a center of the first housing.

Clause 33. A system for assisting a user in providing chest compressions to a patient, the system comprising: a first motion sensor configured for measuring motion of a first region of a thorax of the patient; a first housing physically coupled with the first motion sensor, the first housing comprising: a first frame for holding the first motion sensor in place, and a padding for receiving at least a portion of at least one hand of the user during chest compressions, the padding covering the first frame and the first motion sensor, the padding having an upper surface and a lower surface with a thickness between the upper surface and the lower surface of between about 0.1 inches and about 2.5 inches; a second motion sensor configured for measuring motion of a second region of the thorax of the patient; and a second housing physically coupled with the second motion sensor and comprising a second frame for holding the second motion sensor in place.

Clause 34: The system of clause 33, wherein the padding comprises a textured exterior having a plurality of raised surface features.

Clause 35: The system of clause 34, wherein the plurality of raised surface features comprise a plurality of protrusions extending from the textured exterior of the padding.

Clause 36: The system of one of clauses 34 or 35, wherein the plurality of protrusions are arranged according to a concentric pattern.

Clause 37: The system of any one of clauses 33-36, wherein the padding comprises central region designated by a cross-shaped marking.

Clause 38: The system of any one of clauses 33-37, wherein the padding comprises a substantially circular shape.

Clause 39: The system of clause 38, wherein the first frame comprises a substantially circular shape having a radius smaller than a radius of the padding.

Clause 40: The system of clause 39, wherein the radius of the padding is between about 0.5 inches and about 2.5 inches.

Clause 41: The system of any one of clauses 33-40, wherein the padding comprises an overmold encasing the first frame and the first motion sensor.

Clause 42: The system of any one of clauses 33-41, wherein the first frame is more rigid than the padding.

Clause 43: The system of any one of clauses 33-42, wherein the first frame comprises a first receptacle for receiving the first motion sensor, and the second frame comprises a second receptacle for receiving the second motion sensor.

Clause 44: The system of clause 43, further comprising a first adhesive material located within the first receptacle for adhering the first motion sensor and the first frame, and a second adhesive material located within the second receptacle for adhering the second motion sensor and the second frame.

Clause 45: The system of one of clauses 43 or 44, further comprising a connector and a cable for providing electrical communication between the first and second motion sensors and a computing device.

Clause 46: The system of clause 45, wherein the computing device comprises at least one of: a patient monitor, a defibrillator, and a mobile computing device.

Clause 47: The system of one of clauses 45 or 46, wherein the first receptacle is configured to receive a first portion of the cable, and the second receptacle is configured to receive a second portion of the cable.

Clause 48: The system of any one of clauses 33-47, wherein the first region comprises an anterior portion of the thorax of the patient, and the second region comprises a posterior portion of the thorax of the patient.

Clause 49: The system of any one of clauses 33-48, wherein the first motion sensor comprises a first accelerometer and the second motion sensor comprises a second accelerometer.

Clause 50: The system of any one of clauses 33-49, further comprising at least one processor and memory communicatively coupled with the first motion sensor and the second motion sensor, the at least one processor and memory configured to: receive and process signals from the first motion sensor and the second motion sensor to estimate compression depth during administration of chest compressions by the user.

Clause 51: The system of clause 50, further comprising an output device configured to provide chest compression feedback for the user, wherein the at least one processor and memory are configured to: compare the estimated compression depth to a desired compression depth range, and cause the output device to provide an indication of the estimated compression depth and provide the chest compression feedback for the user.

Clause 52: The system of any one of clauses 33-51, further comprising a first electrode configured to be adhered to the first sensor, and a second electrode configured to be adhered to the second sensor.

Clause 53: The system of clause 52, wherein the first and second electrodes are configured to measure ECG signals of the patient.

Clause 54: The system of one of clauses 52 or 53, wherein the first and second electrodes are configured to provide a defibrillation shock to the patient.

Clause 55: The system of any one of clauses 33-54, wherein the textured padding comprises an oval shape.

Clause 56: The system of clause 55, wherein the first frame comprises a substantially circular shape.

Clause 57: The system of any one of clauses 33-56, wherein the first motion sensor is positioned at a center of the first housing.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limit of the subject matter presented herein.

DETAILED DESCRIPTION

Figure 1:
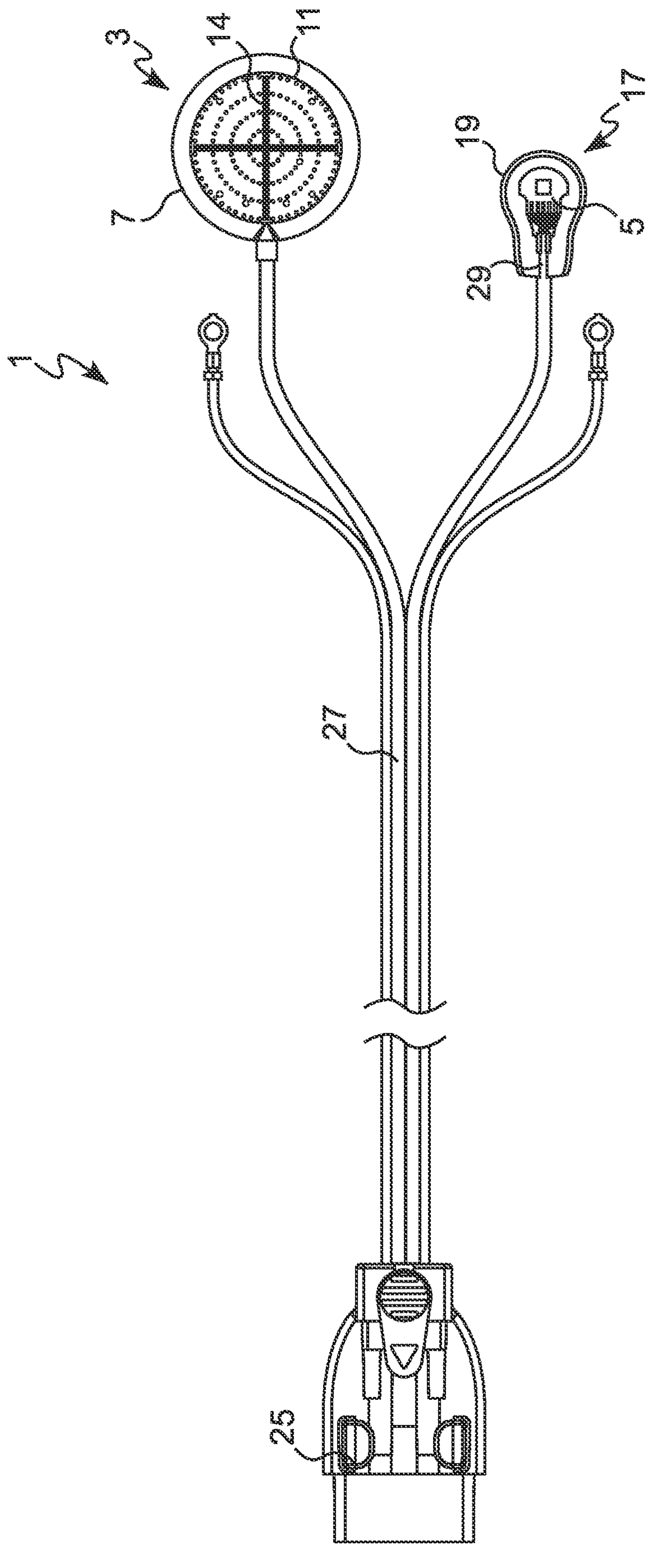
FIG. 1 is a top plan view of a system for assisting a user in providing chest compressions to a patient in accordance with the present disclosure.

The present disclosure relates to a system for assisting a user in providing chest compressions to a patient. The system and methods described in the present disclosure allow for more flexible pad designs that are intuitive to use while holding in place on the patient during chest compressions. The present disclosure provides a system that includes a pair of motion sensors where the pair of motion sensors include a streamlined, low-profile design (e.g., having a thickness of less than 0.5 inches) where at least one of the motion sensors is covered with a padding having a textured surface. The textured surface may be created by providing the surface of the padding with a roughened feel. In addition, the textured surface may be created by adding grip features, such as a plurality of protrusions, to the surface of the padding. These protrusions may be provided in a variety of different configurations as will be discussed below. This allows for a sensor system that is easy to use by the rescuer while also providing a comfortable, slip resistant surface upon which the rescuer can deliver chest compressions. In some examples, the textured surface has a mechanical structure having raised features/protrusions that provide tactile feedback for the user to properly position the fingers/hand in a desired manner.

The American Heart Association (AHA) and the European Resuscitation Council (ERC) have established guidelines for the performance of CPR, which more recently recommend compression depths of 2.0 to 2.4 inches on adults with rates of 100 to 120 compressions per minute (cpm), compression depths between 5.0-6.0 cm for children 8-18 years of age, compression depths of at least one-third the diameter of the chest for children under 8 years of age, compression depths of about 5.0 cm for children 1-8 years of age, or compression depths of about 4.0 cm for infants less than 1 year of age. These guidelines require higher accuracy from chest compression sensor measurements and lead to a need to significantly reduce sources of measurement error, such as compressible foam layers, sensor tilt or rotation, and mattress compression. These sources of error are particularly noticeable on pediatric patients in the hospital environment, as the error is oftentimes a higher percentage of the total measurement and as the patients are often treated when laying on a mattress. Accordingly, a need exists for an improved system for assisting a user in providing chest compressions to a patient that improves the accuracy chest compression sensor measurements and further to also provide overall ease and comfort of use by the rescuer for a variety of patients.

According to one aspect of the present disclosure, the system comprises: a first motion sensor configured for measuring motion of a first region of a thorax of the patient; and a first housing physically coupled with the first motion sensor. The first housing comprises: a first frame for holding the first motion sensor in place, and a textured padding for receiving at least a portion of at least one hand of the user during chest compressions. The textured padding covers the first frame and the first motion sensor. The textured padding comprises an exterior having a plurality of raised surface features. The padding may have an upper surface and a lower surface with a thickness between the upper and lower surfaces of, for example, less than 1 inch (0.1-1 inch), less than 0.5 inches (0.1-0.5 inches), between 0.005 inches and 0.3 inches. The system also comprises: a second motion sensor configured for measuring motion of a second region of the thorax of the patient; and a second housing physically coupled with the second motion sensor and comprising a second frame for holding the first motion sensor in place.

In addition, the system for assisting the user in providing chest compressions to the patient of the present disclosure may be incorporated into a resuscitation assembly that may be used for a wide variety of patients in need of resuscitation, such as for small (e.g., pediatric, infant) or large (e.g., adult) patients. In various embodiments, the resuscitation assemblies may include at least a pair of electrode assemblies usable for monitoring ECG of the patient and/or providing electrotherapy to the patient (e.g., defibrillation upon detection of a shockable ECG rhythm), along with the first and second motion sensors.

Resuscitation assemblies and systems described herein may provide for improved resuscitation over prior devices and methods, for example, by providing sensors designed with shape and material features that provide for an intuitive feel during use, and which also provide for improved accuracy, detection and/or correction in determining resuscitation related parameters, such as chest compression depth, angle of chest compressions, the presence of an error-inducing surface (e.g., compressible surface between the patient and the sensor, such as foam, or a compressible surface under patient, such as a soft mattress, etc.), chest compression rate and/or timing, ventilation rate, etc. Systems and resuscitation assemblies in accordance with the present disclosure provide improved accuracy in determining chest compression depth than previously possible with single sensor arrangements, for example, by detecting and/or correcting for errors in resuscitation parameters as a result of external sources, e.g. error-inducing surface, patient is in transport (e.g., traveling on a gurney or within an ambulance), etc. Accordingly, such systems may advantageously provide improved feedback on whether chest compressions are appropriately applied and/or whether the rescuer needs to correct for error from an external source (e.g. change the surface on which the patient is placed, reduce other motion induced error, etc.).

Measurement of chest compressions during Cardiopulmonary resuscitation (CPR) is a valuable feedback tool for both trained and untrained rescuers to ensure adequate compression depth and rate. Compression quality is quantified by placing an accelerometer anteriorly on the chest and calculating depth and rate from the measured acceleration. Inaccuracies in depth calculations may arise from several potential sources; external motion of the patient (such as ambulance motion), compressible layers such as foam or clothing between the sensor and the patient while compressions are being performed, and chest compressions being performed while the patient is on a compressible surface such as a mattress. One proposed solution to reduce the influence of patient motion unrelated to chest compression motion is to add a second accelerometer located posteriorly. The posterior accelerometer would measure any external movement and compression of a mattress. The difference in motion between anterior and posterior electrodes would allow the calculation of true compression depth into the chest. Details of resuscitation assemblies utilizing a pair of motion sensors to provide feedback to a user are disclosed in U.S. Pat. No. 10,406,345, entitled "Dual Sensor Electrodes for Providing Enhanced Resuscitation Feedback," assigned to the assignee of the present application, and which is hereby incorporated by reference in its entirety. Design decisions such as minimizing the compressibility of or removing any layers between the accelerometer and the patient chest such as those presented in this disclosure can reduce measurement inaccuracies. In accordance with aspects of the present disclosure, the design of such motion sensors should be small so as to reduce overall bulk while also providing a comfortable surface upon which a user can administer chest compressions and minimizing hand slippage from the sensor surface. Such motion sensors may also be designed so that users may be able to naturally position their fingers/hands in an appropriate manner so as to effectively administer chest compressions.

Figure 2:
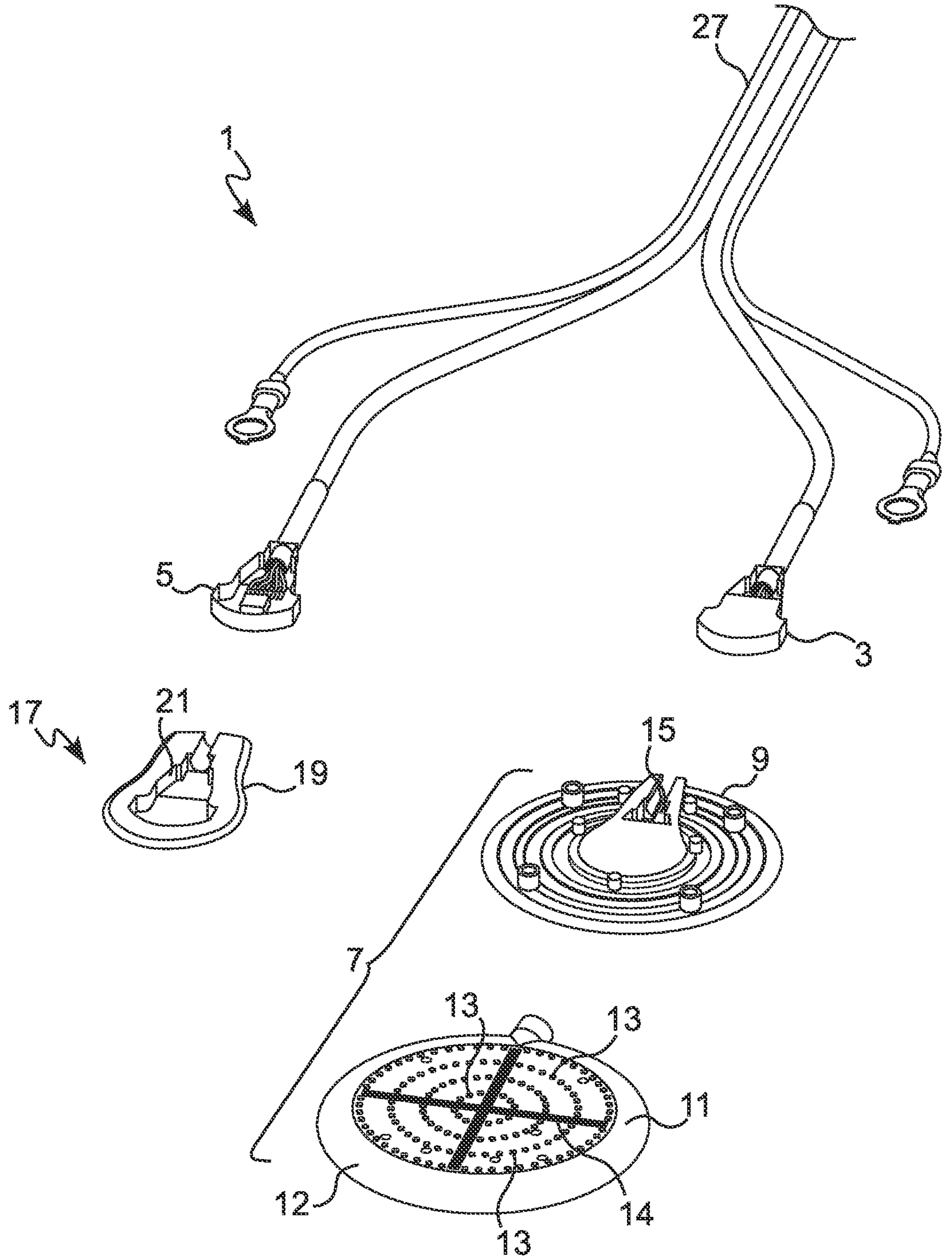
FIG. 2 is a top exploded perspective view of the system of FIG. 1.
Figure 3:
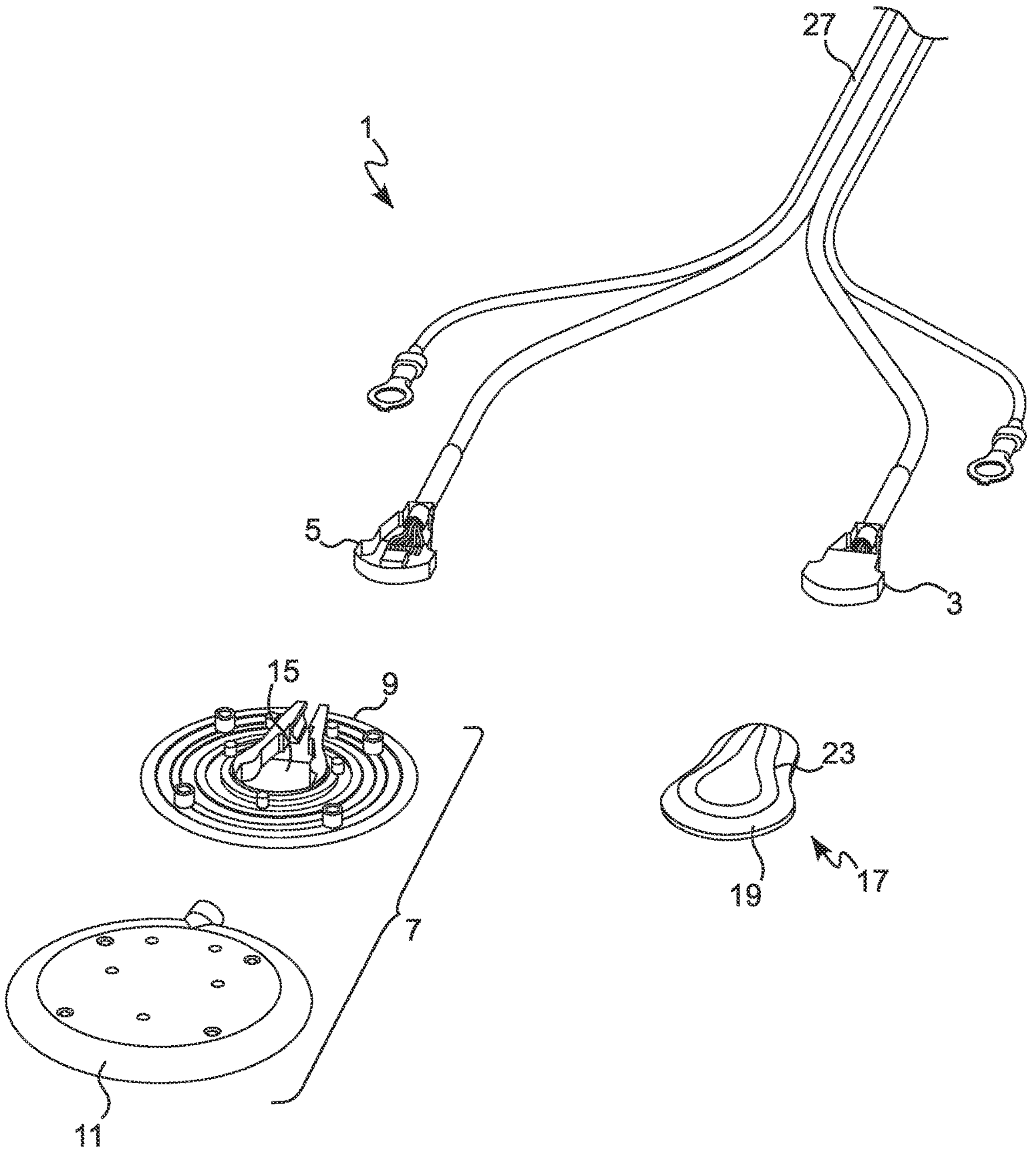
FIG. 3 is a bottom exploded perspective view of the system of FIG. 1.

In certain examples, as illustrated in FIGS. 1-3, the system 1 for assisting a user in providing chest compressions to a patient may comprise: a first motion sensor 3 configured for measuring motion of a first region, such as an anterior portion, of a thorax of the patient when placed thereupon, and a second motion sensor 5 configured for measuring motion of a second region, such as a posterior portion, of the thorax of the patient when placed there at. In one example, the first and second motion sensors 3, 5 may be embodied as accelerometers and may be mounted on printed circuit boards. In some examples, the printed circuit boards are designed so as to reduce the overall surface area of the boards and the number of hardware components mounted to the boards. Accordingly, the size of the boards, and thus the first and second motion sensors 3, 5 are minimal in nature. For example, the printed circuit boards upon which the first and second motion sensors 3, 5 are mounted may have a diameter of 0.75 inches or less, less than 0.5 inches (0.1-0.5 inches), or between 0.1 inches and 1 inch.

Figure 12A:
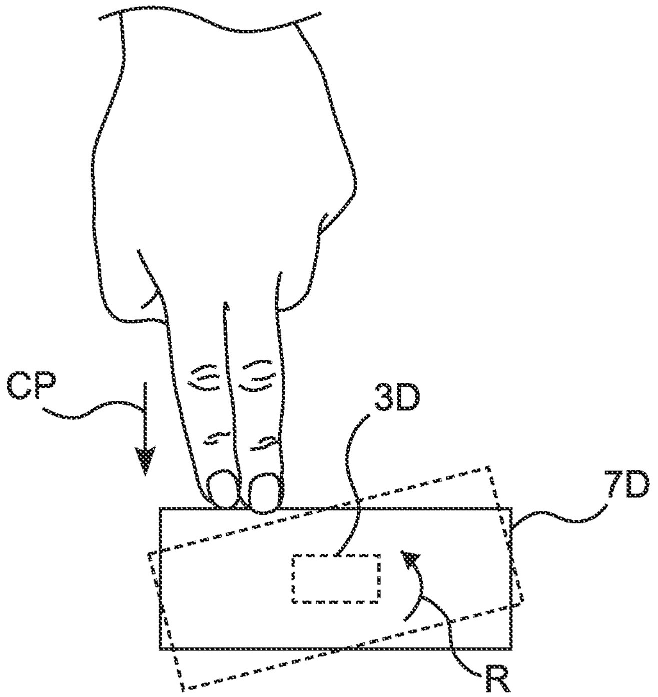
FIG. 12A is a schematic view of a conventional CPR system illustrating a two-finger technique for accomplishing CPR compressions.
Figure 12B:
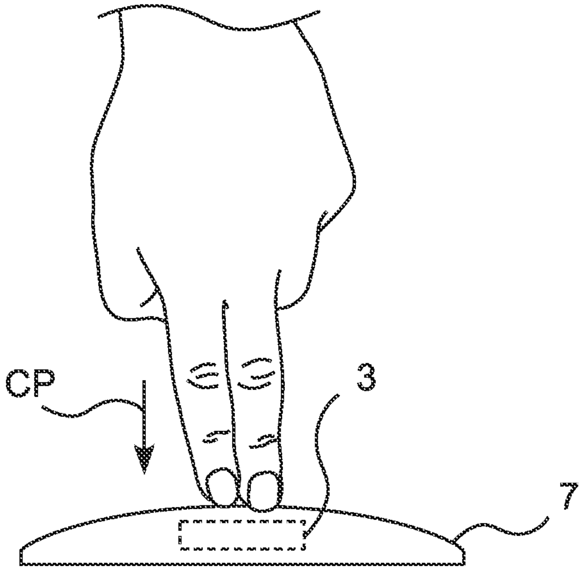
FIG. 12B is a schematic view of the of textured padding for use with a motion sensor of the system of FIG. 1 illustrating a two-finger technique for accomplishing CPR compressions.

It is desirable to reduce the overall size of the board upon which the first and second motion sensors 3, 5 are mounted because, in some clinical settings, particularly when the patients are small children upon which two-finger or two-thumb CPR techniques (discussed in greater detail hereinafter) are used, there may otherwise be a tendency for chest compressions to be performed off-center on the first motion sensor 3. However, in order to record more accurate measurements, compressions should be performed directly over and perpendicular to the first motion sensor 3, so that the actual motion of the chest is tracked. As shown in FIG. 12A, current motion sensors provided with pediatric resuscitation assemblies may be larger than desired, leading to a wide area where compressions are often performed away from the accelerometer 3. That is, the compression pressure (denoted by arrow CP) that is applied to the overall housing 7D might not be properly positioned over or at the location of the accelerometer 3D, but instead an appreciable distance away from the accelerometer 3D. Hence, when compression motion is performed away from the accelerometer 3D, such motion is unable to be accurately tracked. For example, such ill-positioned compressions may result in rotation (denoted in FIG. 12A as arrow R) of the accelerometer (3D), which introduces error to the depth measurement. Accordingly, minimizing or otherwise reducing the surface area of the sensor helps to minimize this error contribution as shown in FIG. 12B. Besides minimizing the area of the printed circuit board upon which the first sensor 3 is mounted, the thickness of the printed circuit board is also minimized to reduce the overall thickness of the system. In one example, a single-sided, single-layer layout was developed for printed circuit board of the first and second motion sensors 3, 5 so that all components and traces would be reside on only one side of the printed circuit board. Further, reducing the size and/or surface area occupied by the sensor assembly may be advantageous so as not to interfere with other clinical treatments, for example, substantially avoiding surgical lines, wounds, or other areas that require clinical measurements. Also, a smaller size of the sensors and electrodes that go with the sensors are particularly preferable for pediatric patients, especially infants and neo-natal patients.

The first motion sensor 3 is encapsulated within a first housing 7 physically coupled with the first motion sensor 3. The first housing 7 comprises: a first frame 9 for holding the first motion sensor 3 in place, and a textured padding 11 for receiving at least a portion of at least one hand of the user (i.e., rescuer) during chest compressions. The frame 9 provides protection for the first motion sensor 3 and also rigidity in case the hands/fingers apply compressive pressure at a location other than where the motion sensor 3 is positioned. For example, if the compression force is applied at the edge of the frame 9, then the motion sensor 3 is still able to move along with the frame 9, subject to the compression. This way, it is not necessary for the hands/fingers to press at the exact position of the motion sensor 3 so long as the resultant motion is perpendicular to the sensor/chest.

The textured padding 11 covers the first frame 9 and the first motion sensor 3. The combination of the textured padding 11 and first frame 9 is made so as to be as thin as possible. For instance, when performing CPR using the two-thumb technique on a small infant or neonatal patient (shown in FIG. 7B), the user will encircle the patient's chest with his/her hands. A bulky (overly thick) sensor will make it difficult for rescuers (particularly those with small hands) to be able to accomplish this task. In this case, the overall size of the second sensor, with housing and frame assembly is particularly relevant for compressions techniques such as encircling hands where the infants/babies are larger and/or the caregiver's hands are smaller in nature, and having larger sensors would otherwise be more difficult to use. In addition, the textured padding 11 is shaped to minimize the area covering the chest of the patient while still being a comfortable surface to perform compressions on. That is, a padding structure that is excessively large in diameter/width may not only have a bulky feel during compressions, but may also lead to inaccurate compression readings, for example, if the rescuer is applying compressions at a location far away from where the motion sensor is positioned. A padding structure that is too large may also not fit on a large portion of the pediatric patient population or may be in the way of surgical lines, wounds, or other monitoring devices necessary for patient care. A padding structure that is too small in diameter/width may be difficult to handle, for example, could slip off the rescuer's hands/fingers during compressions. Also, the textured padding is shaped so as to accommodate and allow for multiple compression techniques to be performed (encircling hands or two thumb, two fingers, single palm). With reference to FIGS. 1-3, the textured padding 11 for a pediatric sensor is designed to have a circular shape with tapered edges 12 for added comfort. For instance, the tapered edges 12 of the padding 11, or reduced sharpness of the edges, may reduce the possibility of sore points developing on the user's hands or on the patient's chest. The textured padding may be made from a rubbery and semi-compliant material which will provide a comfortable surface to perform compressions onto yet rigid enough to protect the first motion sensor 3 during the administration of chest compressions. Examples of such materials include thermoplastic elastomers, polyurethane, foam, rubber, silicone, neoprene, santoprene, and any other suitable materials.

A problematic issue that has arisen in the field with current CPR sensors is that the user's hands may have a tendency to slip off the sensor when performing chest compressions. This is particularly a problem in the presence of fluids (e.g., rain, vomit, blood, neonatal fluid, or bodily fluids), which is a common occurrence in an emergency event, and/or with infants/neonates. In order to minimize this issue, the textured padding 11 comprises an exterior having a plurality of raised surface grip features 13 that protrude from the base surface. These raised surface features may provide added friction for the user to better grip the sensors during compressions, lessening the chance of slippage. Accordingly, the textured padding 11 may provide tactile feedback for the user as to where the hands of the user are positioned or oriented relative to the first housing 7. As a result, without having to look at the sensors during compressions, the user may be able to better position the thumbs in the appropriate manner by feel only. Such tactile feedback provides a means for the user to learn the feel of adequate versus inadequate hand placement. Also, such non-visual feedback is advantageous in that it allows the user to view other parts of the scene, for example, a viewing monitor that provides chest compression feedback (e.g., visual indications of depth, rate, release, quality of compressions, etc.) and/or the actions of other people nearby. In addition, the textured padding 11 is configured to provide a slip resistant surface that enhances comfort for the user when providing chest compressions to the patient.

Figure 5A:
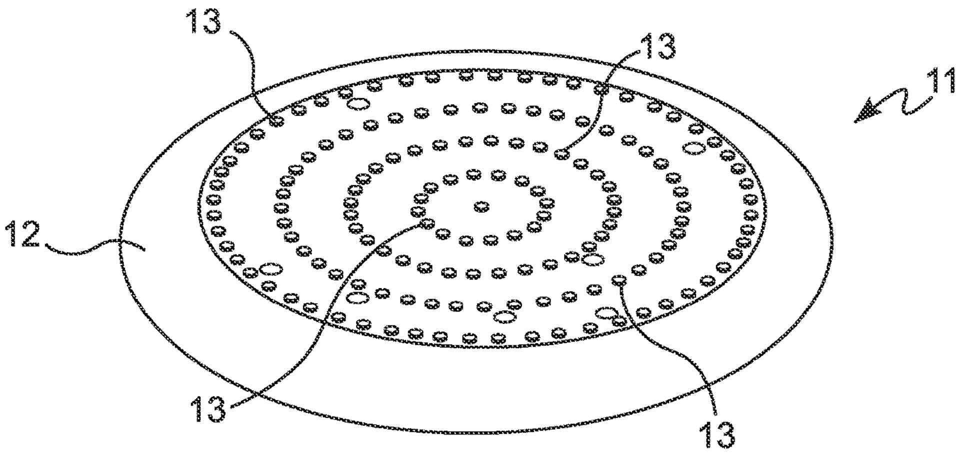
FIG. 5A is a perspective view of one example of textured padding for use with a motion sensor of the system of FIG. 1.
Figure 5B:
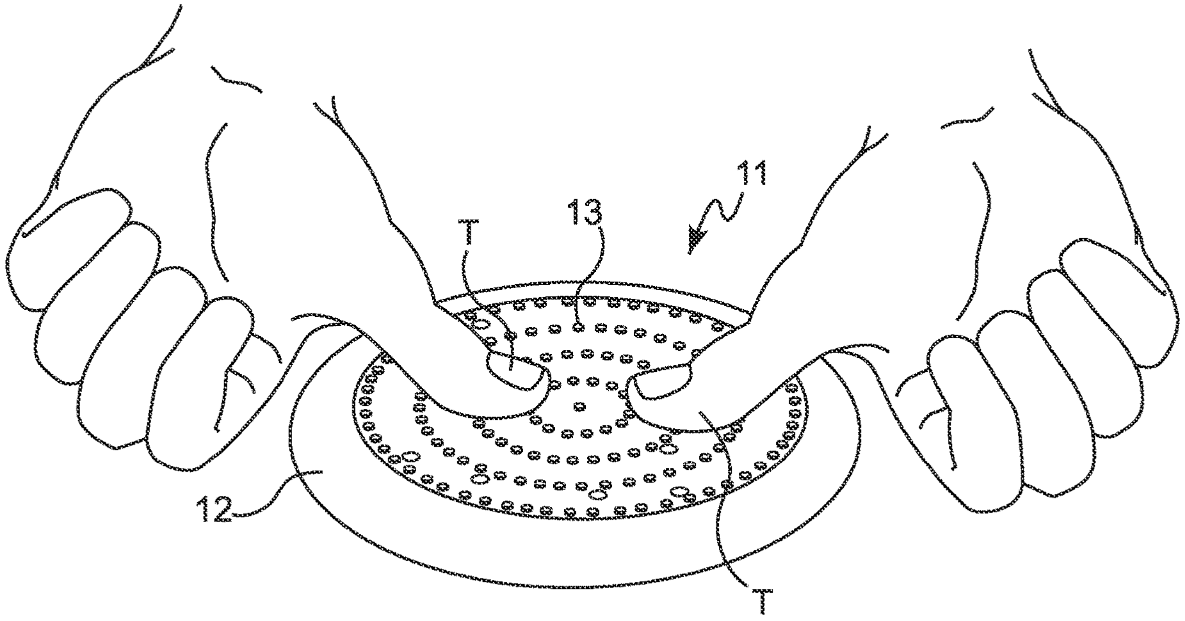
FIG. 5B is a perspective view of the textured padding of FIG. 5A illustrating the two-thumb technique for accomplishing CPR compressions.
Figure 6A:
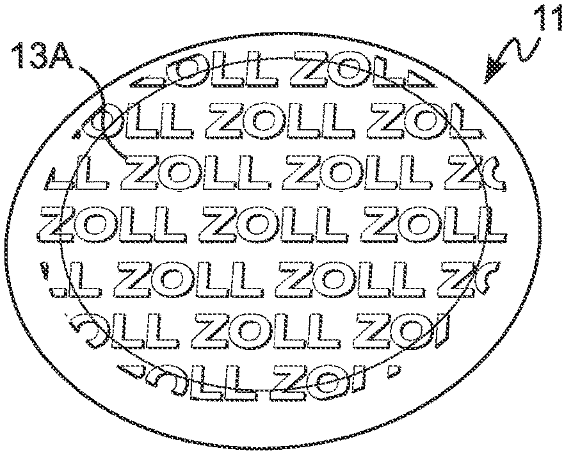
FIGS. 6A-6E are perspective views of other examples of textured padding for use with the motion sensor of the system of FIG. 1.
Figure 6B:
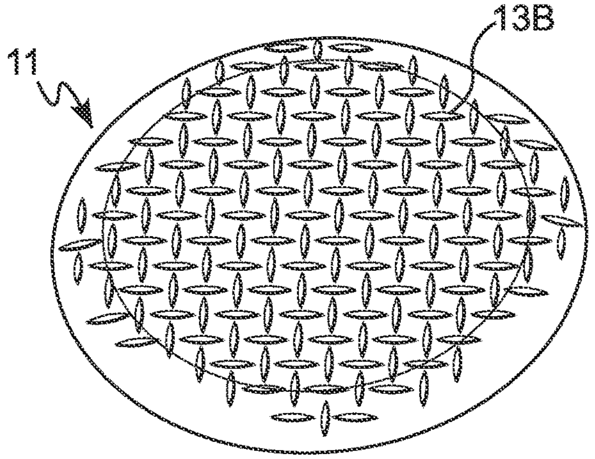
Figure 6C:
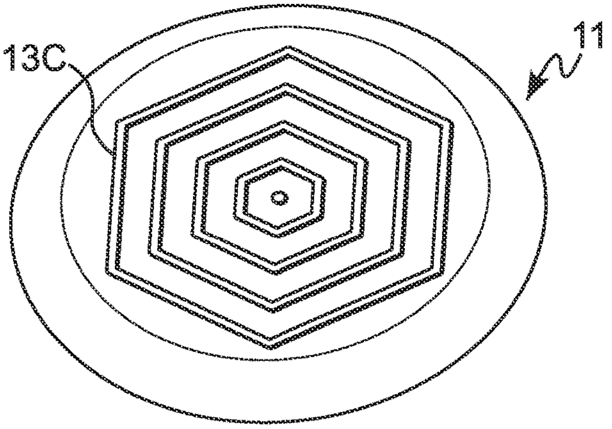
Figure 6D:
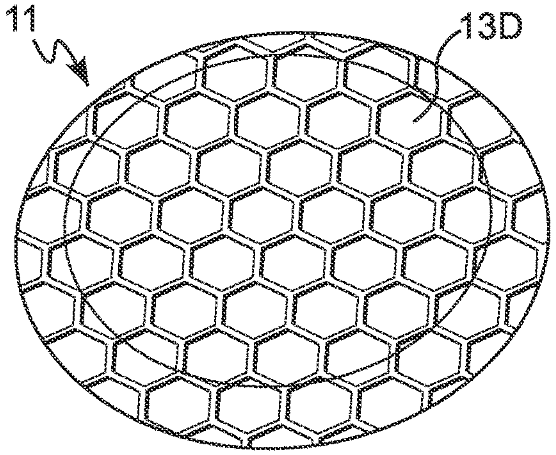
Figure 6E:
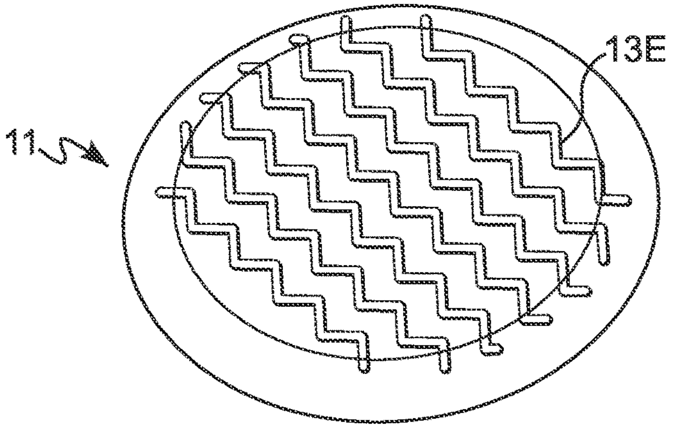

In one example, the plurality of raised surface features 13 comprise a plurality of protrusions extending outwardly from the exterior of the textured padding 11. With reference to FIG. 5A, the plurality of protrusions may be arranged according to a concentric pattern. As shown in FIG. 5A, in one example, the concentric pattern may include a single protrusion (or one or more protrusions) in the center surrounded by rings having an increasing number of protrusions. In other examples, a concentric pattern may be continuous, without separate protrusions, or having larger protrusions, where the overall surface area of the protrusion(s) increases with distance from the center. The arrangement of the protrusions in such a concentric pattern provides both visual and tactile feedback to the user of the location at which the hands/thumbs/fingers are to be positioned during chest compressions. For example, the user may feel his/her thumbs T positioned at the center of the concentric pattern or close to the tapered edge, and then naturally move the thumbs T so as to be slightly offset on either side from the center as shown in FIG. 5B, allowing for balanced compressive pressure to be applied to the overall structure. In addition, the protrusions extend outwardly from the exterior of the textured padding 11 at a height that is tall enough to provide both visual and tactile feedback to the user and also short enough to mitigate the possibility of pain or damage to the user's hands during compression. Accordingly, in some examples, the plurality of protrusions may have an average height per protrusion of between about 0.005 inches and about 0.1 inches, between about 0.0075 inches and about 0.025 inches, or between about 0.001 about 0.2 inches. In addition, the plurality of protrusions may cover an average area per protrusion of between about 0.0001 square inches and about 0.01 square inches, between about 0.0005 square inches and about 0.002 square inches, or between about 0.00001 square inches and about 0.02 square inches.

While the arrangement of the protrusions in a concentric pattern is discussed hereinabove and illustrated in FIG. 5A, this is not to be construed as limiting the present disclosure as any suitable raised surface feature could be utilized to mitigate slippage of the hands of the user during chest compression application. For example, as few as two, three, four, five, or another appropriate amount of protrusions sufficient to enable the user to intuitively feel where the hands are on the sensor may be provided that extend from the exterior of the textured padding to provide visual and tactile feedback to the rescuer. In addition, with reference to FIGS. 6A-6E, a raised logo 13A, a diamond pattern 13B, a plurality of concentric circles or polygons 13C, a honeycomb pattern 13D, or a plurality of wavy lines 13E may be utilized to prevent slippage of the users hand from the textured padding during chest compressions.

In some examples, as shown in FIGS. 1 and 2, a central region of the textured padding 11 may be designated by a cross-shaped marking 14 that serves as cross hairs or a target to guide the user to properly place the first motion sensor 3 at a suitable anterior position over the sternum of the patient. Such a marking 14 may lead a user to apply compressions such that the net compressive force is directed at the center of the target.

The first frame 9 includes a first receptacle 15 for receiving the first motion sensor 3. The first motion sensor 3 may be friction fit within the first receptacle 15 or a first adhesive material may be located within the first receptacle 15 for adhering the first motion sensor 3 and the first frame 9. In addition, the first frame 9 may also comprise a substantially circular shape having a radius smaller than a radius of the textured padding 11, so that the textured padding may be able to cover the frame. The radius of the textured padding 11 may be between about 0.5 inches and about 2.0 inches while the radius of the first frame 11 may be between about 0.4 inches and about 1.9 inches.

In one non-limiting example, the first frame 9 is manufactured from a material that is substantially more rigid than the material used to form the textured padding. For example, the first frame 9 may comprise a polymeric material comprising at least one of: polycarbonate, polypropylene, polystyrene, polyethylene, ABS, nylon, silicone, elastomer, neoprene, santoprene, polyurethane, or any other suitable material. The polymeric material may have a Shore 00 durometer of between 60 and 100 (e.g., between 70 and 90, between 75 and 90), a Shore A durometer of between 20 and 100 (e.g., between 20 and 50, between 25 and 45), or a Shore D durometer of between 1 and 60 (e.g., between 1 and 20, between 5 and 15, between 5 and 10), and/or a Young's modulus of between 1 MPa and 20 MPa (e.g., 1-10 MPa, 1-5 MPa, 1-2 MPa), so as to provide for a comfortable, slip resistant surface material. Shore durometer measures the depth of an indentation in the material created by a given force on a standardized presser foot. This depth is dependent on the hardness of the material, its viscoelastic properties, the shape of the presser foot, and the duration of the test. The ASTM D2240 standard recognizes twelve different durometer scales using combinations of specific spring forces and indentor configurations. These scales are referred to as durometer types. The Shore A durometer Type utilizes a 350 truncated cone having a 1.40 mm (0.055 in) diameter and a 8.05 N (821 gf) spring force. The Shore D durometer Type utilizes a 300 cone having a 1.40 mm (0.055 in) diameter and a 44.45 N (4,533 gf) spring force. The Shore 00 durometer Type utilizes a 1.20 mm (0.047 in) spherical radius presser foot having a 2.40 mm (0.094 in) diameter and a 1.111 N (113.3 gf) spring force. The final value of the hardness depends on the depth of the presser foot after it has been applied for 15 seconds on the material.

The textured padding 11 is configured to encapsulate the first frame 9 and the first motion sensor 3 in any suitable manner. For example, the textured padding may be overmolded onto the first frame 9 and the first motion sensor 3. The textured padding may include a thermoplastic polymeric material comprising one or more of: polycarbonate, polypropylene, polystyrene, polyethylene, ABS, nylon, silicone, elastomer, neoprene, santoprene, polyurethane, and/or another suitable material. The textured padding may exhibit a Shore 00 durometer of between 60 and 100 (e.g., between 70 and 90, between 75 and 90), a Shore A durometer of between 20 and 100 (e.g., between 20 and 50, between 25 and 45), or a Shore D durometer of between 1 and 60 (e.g., between 1 and 20, between 5 and 15, between 5 and 10), and/or a Young's modulus of between 1 MPa and 20 MPa (e.g., 1-10 MPa, 1-5 MPa, 1-2 MPa).

By making the first frame 9 from a material that is more rigid than the textured padding 11 and providing the first motion sensor 3 at the center of the textured padding, another mechanism is provided for allowing the user to self-center his/her hands over the first motion sensor 3, or at least balanced on either side of the motion sensor, during application of chest compressions such that the most accurate measurements can be achieved. One reason for such hand positioning is that if the user positions his her/hand off of a central location, the chest compressions may be more likely to be applied to an edge of the more rigid material of the first frame 9, thereby causing discomfort to the rescuers hand. Accordingly, this material difference will assist the user to move his/her hands to a central location.

For some embodiments, such as for neonatal resuscitation, it may be preferable for the system 1 to exhibit a relatively low profile. For example, when treating an infant, the rescuer may wrap his/her hands around the infant's chest and squeeze from both the front and back (i.e., using the two-thumb technique as discussed further below). Hence, the first motion sensor 3, the first frame 9, and the textured padding 11 may be thin enough for there to be enough space allowing the hands to wrap sufficiently around the infant's body. Less padding may also be required for neo-natal resuscitation because less force is generally applied to infants in comparison to pediatric/adult compressions. In some embodiments, the combination of the first motion sensor 3, the first frame 9, and the textured padding 11 has a thickness of between about 0.1 inches and about 2.5 inches, between about 0.01 inches and about 3.0 inches, or between about 0.25 inches and about 2.0 inches. In other words, the thickness from an upper surface to a lower surface of the textured padding 11 is between about 0.1 inches and about 2.5 inches, between about 0.01 inches and about 3.0 inches, between about 0.25 inches and about 2.0 inches, between about 0.1 inches and about 1 inch, or between about 0.1 inches and about 0.5 inches. It is also beneficial for the system 1 to exhibit a relatively low profile when used with adult patients because it is desirable to have the sensor be as thin as possible such that if hands larger than the sensor apply compressions, the edges and surface difference between the sensor and the chest are not harsh enough to cause discomfort or pressure to the rescuer.

With continued reference to FIGS. 1-3, the system 1 also comprises the second motion sensor 5 configured for measuring motion of a second region, such as a posterior region, of the thorax of the patient; and a second housing 17 physically coupled with the second motion sensor 5 and comprising a second frame 19 for holding the second motion sensor 5 in place. The second frame 19 comprises a second receptacle 21 for receiving the second motion sensor 5. In some examples, the second motion sensor 5 is friction fit within the second receptacle. Alternatively, a second adhesive material (not shown) may be located within the second receptacle 21 for adhering the second motion sensor 5 and the second frame 19. Similar to the first motion sensor 3, the second motion sensor 5 includes an accelerometer and is configured to be as thin and small as possible so it can be effectively hidden and embedded in an electrode pad as will be discussed hereinafter. Accordingly, the surface area of the printed circuit board upon which the second motion sensor 5 is mounted along with the thickness of the printed circuit board are minimized in a similar manner as the printed circuit board of the first motion sensor 3 as discussed herein above. The second frame 10 may be manufactured from the same rigid polymeric material as the first frame 9 to properly protect the electronic components on the printed circuit board at this minimal size. In addition, the second motion sensor 5 is configured to be placed on a posterior portion of a patient's thorax. Accordingly, the second motion sensor 5 and housing 17 are shaped to minimize pressure points and discomfort to the patient laying on it. Specifically, the second frame 19 is provided with tapered edges 23 to improve the patient's comfort when lying on the second frame 19 and to facilitate the smooth transition of layers embedding the subassembly into the pad.

With continued reference to FIGS. 1-3, the system 1 may also further comprise a connector 25 and a cable 27 for providing electrical communication between the first and second motion sensors 3, 5 and a computing device. The computing device may comprise at least one of: a patient monitor, a defibrillator, and a mobile computing device. In addition, the first receptacle 15 may be configured to receive a portion (not shown) of the cable 27, and the second receptacle 21 may be configured to receive a portion 29 of the cable 27.

Figure 4:
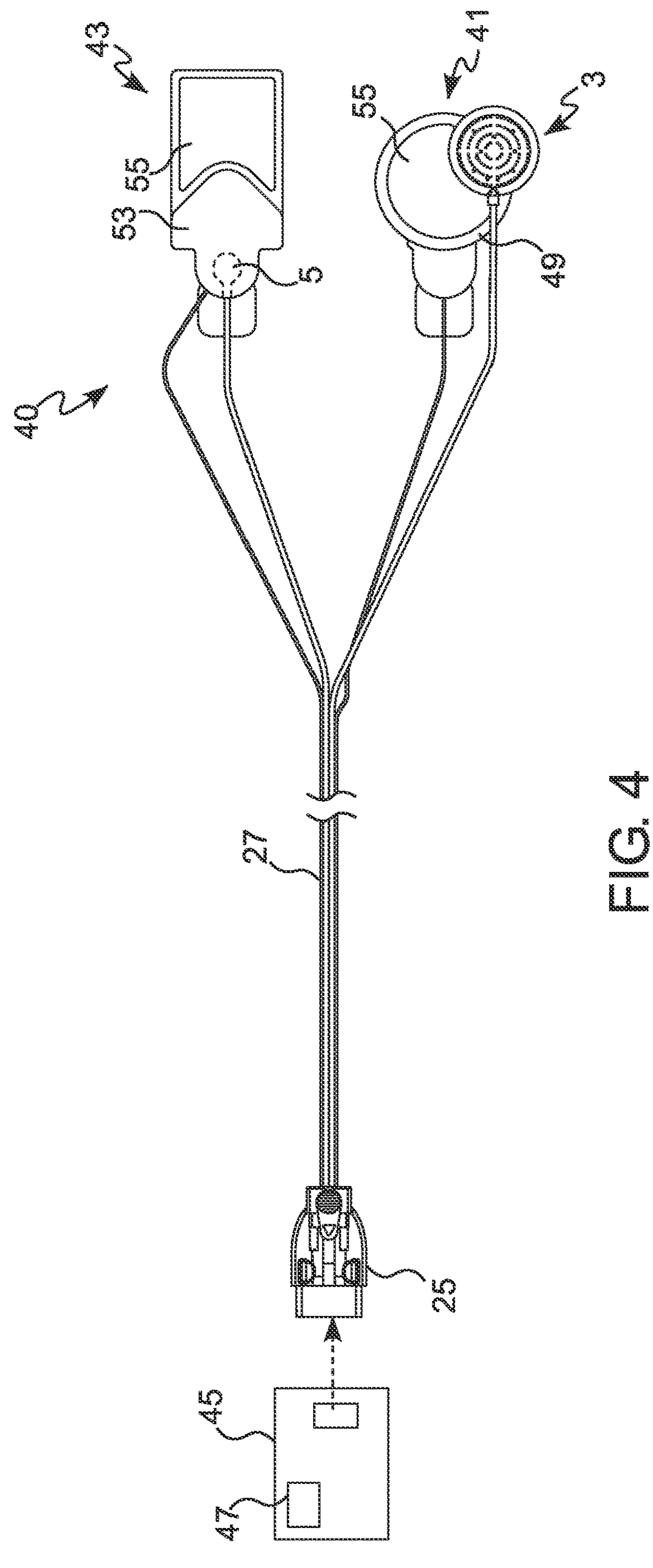
FIG. 4 is a top plan view of a resuscitation assembly for use with a pediatric patient incorporating the system of FIG. 1.

In certain examples, as illustrated in FIG. 4, the system 1 may be utilized as part of a resuscitation assembly 40. The resuscitation assembly 40 comprises a first electrode assembly 41 associated with the first motion sensor 3 and a second electrode assembly 43 associated with the second motion sensor 5. The first electrode assembly 41 may be placed at an anterior position (e.g., over the sternum) of the patient and the second electrode assembly 43 may be placed on a posterior position (e.g., on the back, opposite the anterior placed electrode) of the patient, i.e., in an A-P (anterior-posterior) position. In such a placement orientation, the first and second electrode assemblies 41, 43 are positioned in a manner that forms a vector for electrotherapy (e.g., defibrillation) to be transmitted through the heart. The motion sensors in this placement orientation are also able to track movement of anterior and posterior regions of the thorax. Accordingly, the accuracy of chest compression depth may be improved relative to single sensor configurations, for example, in cases where the patient is placed on a soft, compressible surface during chest compressions. Alternatively, a first electrode assembly may be placed on an anterior position of the patient and a second resuscitation electrode assembly may be placed on a side position of the patient, i.e., in an A-A (anterior-anterior) position. In this placement orientation, the first and second electrode assemblies 41, 43 are also positioned in a manner that forms a vector for electrotherapy (e.g., defibrillation) through the heart. In such a context, it may be advantageous to be able to track the movement of each of the electrode assemblies as they are coupled to the patient. Tracking such movement may be helpful so as to identify the placement position and also be able to provide guidance for the caregiver depending on the placement position (e.g., whether A-P or A-A) and/or whether to adjust how the electrode/sensor assemblies are placed if not properly positioned. For example, if the electrode/sensor assemblies are placed in a configuration that is neither A-P nor A-A, then a patient monitor/defibrillator or other feedback device may provide instructions for the caregiver to move one or more of the components (e.g., electrodes and/or sensors), or simply alert the caregiver to the possibility that the electrode/sensors assemblies are misplaced. As further discussed herein, the motion sensor may be detached from the electrode assembly such that even when the electrodes are placed in the A-A position, the motion sensors may be placed so that one of the motion sensors is located on the anterior of the thorax and the other of the motion sensors is located on the posterior of the thorax, so as to provide more accurate chest compression depth information.

As described herein, each electrode assembly placed on the patient may incorporate a chest compression sensor, for example first and second motion sensors 3, 5 (e.g. accelerometers, velocity sensors, ultrasonic sensors, infrared sensors, other sensors for detecting displacement). In certain examples, the motion sensors may be single axis or multiple axis accelerometers. Single axis accelerometers may be used to determine chest compression parameters (e.g. depth, rate, velocity, timing, etc.) by measuring and/or providing signals that assist in determining acceleration, velocity and/or displacement. Multi-axis accelerometers, e.g. a three-axis accelerometer, may be able to provide signals that further determine relative orientation of their respective electrode assemblies by measuring parameters indicative of motion along each axis, in addition to determining chest compression parameters. The motion sensors 3, 5 may also include a gyroscope for determining orientation of the sensor (and, in some cases, the electrode assembly) by way of tilt or rotation. In additional examples, two or more accelerometers may be arranged orthogonally with respect to each other, to determine electrode and/or chest acceleration in multiple orthogonal axes. While an accelerometer senses acceleration or gravity, motion or displacement of the accelerometer can be determined through a series of calculations, such as double integration, filtering and/or other appropriate processing steps.

As discussed herein, by incorporating motion sensors in both electrode assemblies, resuscitation related parameters may be more accurately determined than would otherwise be the case if only one electrode assembly incorporated a motion sensor. For instance, the electrode assemblies may serve as reference points for one another, based on their respective displacement and orientation. Accordingly, the manner in which the electrode assemblies (e.g., electrode pads) are placed and/or how they move relative to one another may inform the type of instructions output to a rescuer. As an example, discussed further below, based on their orientation and/or distance relative to one another, it can be determined whether the electrode assemblies are placed in an A-A or A-P position, or not in any recommended position at all. In addition, based on the pattern of movement of both electrode assemblies, the type of surface on which the patient resides can be determined, or the angle with respect to the vertical axis (when the patient is lying down) at which chest compressions are being administered can also be estimated. Additional details of dual sensor electrodes and the manner in which such electrodes operate can be found in U.S. Pat. No. 10,406,345.

The resuscitation assembly of FIG. 4 is configured to be operatively connected to a monitor/defibrillator 45, such as a ZOLL Medical R Series or X Series Monitor Defibrillator, which can operate as an AED, a semi-automatic defibrillator (SAD), and/or a manual defibrillator with a monitor, and can also be used for cardioverting and pacing, through connector 25 and cable 27. However, this is not to be construed as limiting the present disclosure as the resuscitation assembly of the present disclosure may be used with any suitable defibrillator and/or patient monitoring (e.g., physiological monitor without defibrillation capability) system. The defibrillator 45 is operable to generate a defibrillating shock and deliver that shock to the patient through the electrode assemblies 41, 43. In one example, the defibrillator 45 can include an ECG monitor and display 47 for analyzing the ECG signals obtained through the electrode pad and displaying the ECG waveform to a user. The display can also provide the user with feedback regarding chest compressions as disclosed in U.S. Pat. No. 9,289,134, entitled "Defibrillator Display," assigned to the assignee of the present application, and which is hereby incorporated by reference in its entirety.

With continued reference to FIG. 4, the resuscitation assembly 40 includes two (or more) electrode assemblies 41, 43 that each may include a flexible electrode pad 49, 51 having a therapy side configured to be coupled to the patient. In addition, first electrode assembly 41 further includes the first motion sensor 3 described hereinabove. The first motion sensor 3 is attached to a side of the electrode pad 49 opposite the therapy side at an attachment region 53. The first motion sensor 3 may be attached to a side of the electrode pad 49 in any suitable manner such as, but not limited to, the use of a double sided adhesive pad, hook and loop fasteners, snap attachment, or other arrangement. The first motion sensor 3 may be fixedly or removably coupled to the flexible electrode pad 49. The electrode pad 49 and first motion sensor 3 may be attached at attachment region 53 by any suitable method, for example, at the point of attachment, the electrode pad and the housing 7 of the first motion sensor 3 may be formed of the same material (e.g., foam padding), mechanically coupled (e.g., interlocking), stapled, sutured, stitched, non-adhesively coupled (e.g., placement within a pocket or pouch designed to receive the sensor and its respective housing), adhesively coupled, or otherwise adhered (e.g., using hook and loop fasteners) or coupled. For example, as shown in FIG. 4, the first motion sensor 3 and the electrode pad 49 are directly attached to one another only along the attachment region 53. Accordingly, particularly for small (pediatric, undersized) patients or those suffering from conditions (e.g. kyphosis) that may warrant such a configuration, the flexible electrode pad 49 may be better suited to conform to the surface contours of the patient's body than may be the case if the electrode pad 49 and the first motion sensor 3 are attached along the entire surface of contact there between. It can be appreciated that various alternative attachment regions 53 may be utilized such as, but not limited to attachment at a central upper region and/or a central lower region of the assembly. In each configuration, since the more rigid first motion sensor 3 is only connected at the attachment region 53 and not across the entire surface of the flexible electrode pad 49, forces delaminating or otherwise pulling the flexible electrode pad 49 away from the patient's anatomy due to the connection between the first motion sensor 3 and the flexible electrode pad 49 are reduced and at least a portion of the flexible electrode pad 49 is capable of flexing away from the first motion sensor. This allows the flexible electrode pad 49 to better follow contours of the patient's anatomy so as to be suitably adherent thereto while remaining attached to the first motion sensor than would otherwise be the case if the flexible electrode pad 49 were attached completely flush to the first motion sensor 3.

In addition, the location of the first motion sensor 3 with respect to the electrode pad 49 is aimed at providing proper positioning of the first motion sensor 3 above the sternum of the patient and the flexible electrode pad 49 above the heart for the majority of the population. In order to provide proper electrode pad and motion sensor positioning for those cases where the patient is larger than the placement that the standard design provides, the first motion sensor 3 may be designed to be removed from the flexible electrode pad 49. Since chest compressions are a mechanically stressful action onto the electrode assembly 41, the mechanisms for separating the first motion sensor 3 from the flexible electrode pad 49 must be secure enough so that it would not detach during the administration of chest compressions, yet easy enough to engage such that when desired, it would be simple to separate the first motion sensor 3 from the flexible electrode pad 49. Non-limiting examples of suitable attachment mechanisms between the first motion sensor 3 and the flexible electrode pad 49 are perforations along the attachment region 53, hook and loop fasteners for holding the motion sensor in place on the flexible electrode pad yet allowing for easy detachment and reattachment when needed, and an adhesive layer connected the housing 7 of the first motion sensor 3 to a side of the electrode assembly 49 opposite the therapy side.

The second motion sensor 5 is embedded within the flexible electrode pad 51. Accordingly, the second motion sensor 5 is made as thin as possible so that it can be effectively hidden in the electrode pad 51 and to minimize pressure points and discomfort to a patient lying on it. The first electrode assembly 41 is intended to be positioned on an anterior portion of the thorax of the patient, such as the sternum, and the second electrode assembly 43 is intended to be positioned on a posterior portion of the thorax of the patient. In addition, the resuscitation assembly 40 shown in FIG. 4 is sized and shaped to be used with pediatric patients. While the second motion sensor 5 is illustrated in FIG. 4 as being completely enclosed within the flexible electrode pad 51, this is not to be construed as limiting the present disclosure as the second motion sensor 5 may be only partially embedded within the flexible electrode pad 51. For example, the second motion sensor 5 and its housing 17 may be at least partially exposed. In such examples, the motion sensor and encasement may be constructed to be removable, repositioned and/or replaced.

The flexible electrode pads 49, 51 may be any type of electrode suitable for use in defibrillation, and generally includes a conductor, such as tin, silver, AgCl or any other suitable conductive material, provided at the therapy side; a conductive electrolyte gel, such as a hydrogel; and lead wires to connect the conductor to the cable 27. The flexible electrode pads 49, 51 of electrode assemblies 41, 43 may be similar in their layered construction, although as illustrated in FIG. 4, the lateral shapes of the pads may vary depending on where the pads are to be placed on the patient. For instance, the electrode pad 49 of resuscitation electrode assembly 41 is shown to have rounded edges, providing for relatively easy placement on the chest area of a patient's thorax, while the electrode pad 51 of electrode assembly 43 is shown to be rectangular, providing for more intuitive alignment with the spine on the back area of the patient's thorax than would otherwise be the case for other shapes. Further details of the flexible electrode pads can be found in U.S. Pat. No. 5,330,526, entitled "Combined defibrillation and pacing electrode," which is assigned to the assignee of the present application and is hereby incorporated by reference in its entirety.

With continued reference to FIG. 4, the first motion sensor 3 of electrode assembly 41 may be configured to enable a rescuer to apply chest compressions thereto. In this case, the first motion sensor 3 of resuscitation electrode assembly 41 is offset from the center of the conductive material of the electrode pad 49 so that the conductive material is more likely to remain undamaged during chest compressions. In addition, an upper surface of the first motion sensor 3 of electrode assembly 41 can include graphics, such as a cross-shaped marking 14 as described above, that serves to guide a user to properly place the first motion sensor 3 at a suitable anterior position over the sternum of the patient.

By providing a suitable motion sensor in both the anteriorly positioned electrode assembly 41 and the posteriorly positioned electrode assembly 43, the signals obtained therefrom can be processed by control circuitry provided in the defibrillator 45 to provide information that enhances overall resuscitation care to the patient. For example, data from both motion sensors may be processed to determine more accurate compression depth, particularly when compressions are performed on a compressible surface and/or when, on an infant, a rescuer wraps his/her hands around the infant's chest and squeezes from both the front and back, as will be discussed in greater detail hereinafter.

As one mechanism to ensure proper placement of the electrode assemblies 41, 43 of the resuscitation assembly onto the patient's anatomy, one or both of the electrode assemblies, or a substrate connected to the assemblies, may be provided with pictograms, diagrams, or printed instructions 55 describing the correct position for the electrode assemblies 41, 43. For example, pictograms, diagrams, or printed instructions 55 may be provided on an upper surface of the first motion sensor or the side of the flexible electrode pads 49, 51 opposite the therapy side. In addition, signals from the motion sensors 3, 5 may be utilized by the control circuitry of the defibrillator 45 to prompt the user in the manner in which the resuscitation assemblies, including the electrode assemblies 41, 43, should be placed as discussed in United States Patent Application Publication No. 2016/0279405, entitled "ECG and Defibrillator Electrode Detection and Tracking System and Method," which is hereby incorporated by reference in its entirety.

Figure 7A:
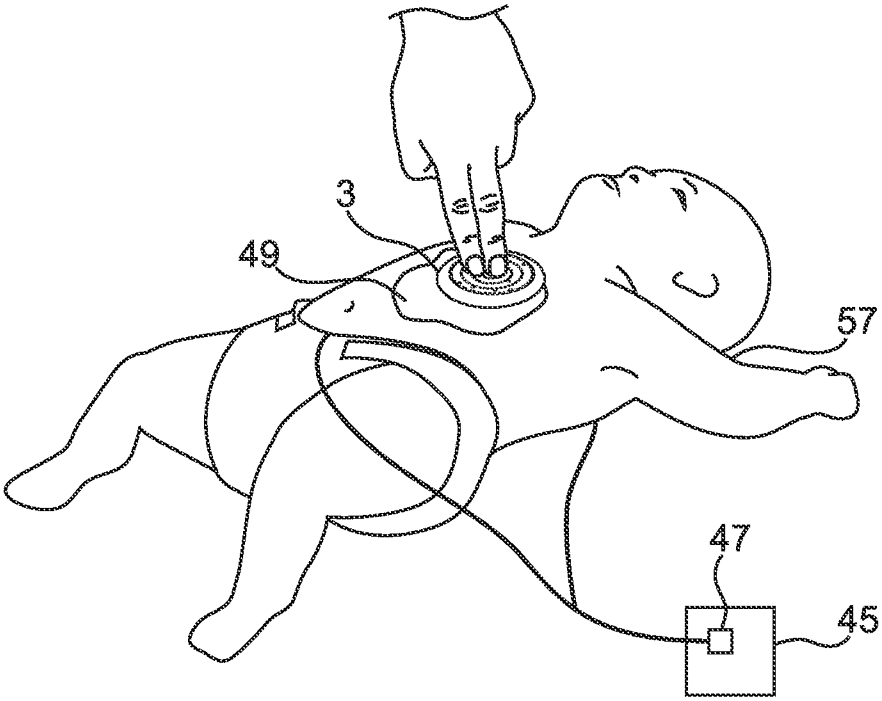
FIG. 7A illustrates a two-finger technique for accomplishing CPR compressions on an infant utilizing a resuscitation assembly in accordance with some embodiments.
Figure 7B:
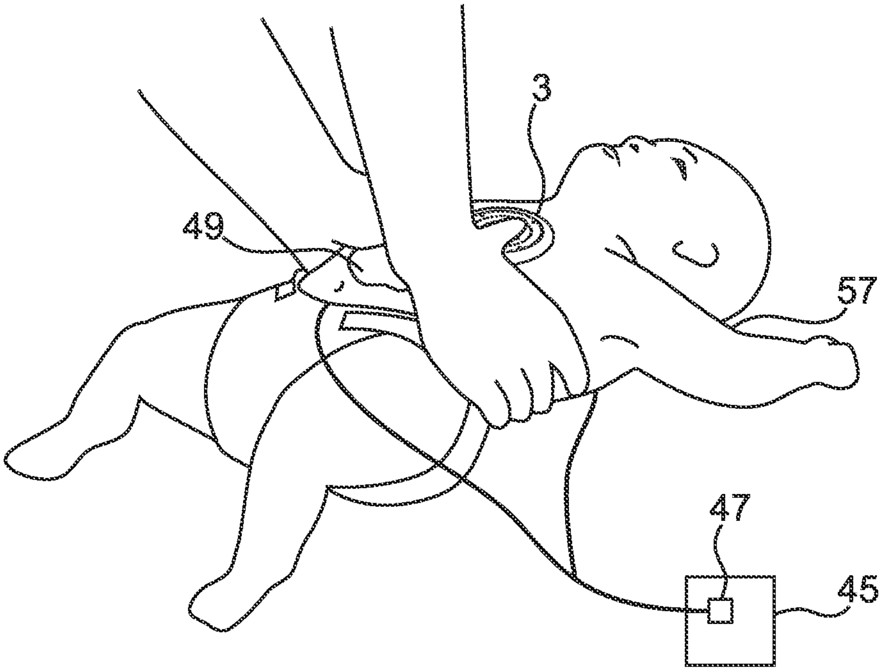
FIG. 7B illustrates the two-thumb technique for accomplishing CPR compressions on an infant utilizing a resuscitation assembly in accordance with some embodiments.

A first method for administering CPR chest compressions to an infant, which may be preferable in some instances, is the two-thumb method as shown in FIG. 7B. This method entails grasping the infant's thorax with both hands, placing both thumbs over the sternum (with the fingers supporting the back of the infant) and using the thumbs to provide compressive force to the sternum. More specifically, the infant is supported on a surface in the supine position. A CPR provider places his/her hands around the infant's thorax, thereby placing his/her thumbs over the infant's sternum with his/her fingers wrapping over the axillary area under the infant's arms and around the infant's back. In this method, the CPR provider squeezes the infant's thorax, with the thumbs pressing on the sternum, to push the sternum toward the spine. In some instances, the fingers holding the infant's back cause undesired motion say push toward the sternum. For some situations, these compressions should be accomplished at a rate of 100 compressions per minute and a depth of about 1.5 inches (3.8 cm) (or one-third of the total thickness of the thorax according to recent AHA guidelines).

A first method for administering CPR chest compressions to an infant, which may be preferable in some instances, is the two-thumb method as shown in FIG. 7B. This method entails grasping the infant's thorax with both hands, placing both thumbs over the sternum (with the fingers supporting the back of the infant) and using the thumbs to provide compressive force to the sternum. More specifically, the infant is supported on a surface in the supine position. A CPR provider places his/her hands around the infant's thorax, thereby placing his/her thumbs over the infant's sternum with his/her fingers wrapping over the axillary area under the infant's arms and around the infant's back. In this method, the CPR provider squeezes the infant's thorax, with the thumbs pressing on the sternum, to push the sternum toward the spine. These compressions should be accomplished at a rate of 100 compressions per minute and a depth of 1.5 inches (3.8 cm) (or about one-third of the total thickness of the thorax).

A second method for administering CPR chest compressions to an infant is often referred to as the two finger method as shown in FIG. 7A. This method entails compression of the infant's chest with two fingers (index and middle fingers) placed over the inter-mammary line (superior to the xiphoid process). Often, and depending on the patient size and weight, the rescuer holds the patient by laying it flat on the other hand. Compressions are generally recommended (in accordance with recent AHA guidelines) to be about 1.5 inches (3.8 cm) (one third of the thickness of the thorax of 4.5 inches (11.4 cm), which is a rough estimate of infant chest thickness which is, of course, variable depending on the age/size of the infant patient). The chest should be released completely after each compression.

In certain situations, the two-thumb-encircling hands technique is preferred over the two-finger technique because the two-thumb technique has been suggested to give rise to higher coronary artery perfusion pressure, resulting more consistently in appropriate depth or force of compressions, and may generate higher systolic and diastolic pressures in the patient.

By positioning the second motion sensor 5 on the back of the infant 57 and the first motion sensor 3 on the chest of the infant 57 through the use of electrode assemblies 43 and 41, respectively, the compression depth of compressions performed on the infant 57 using either the two-thumb or two finger technique can be accurately determined by placing the thumbs or fingers over the first motion sensor 3 and subtracting a distance traveled by the motion sensor 5 of the second electrode assembly 43 from a distance traveled by the motion sensor 3 of the resuscitation assembly 40. In some cases, the use of the two sensor configuration in the A-P position to estimate chest compression depth may be even more effective when using the two-thumb method because this method often results squeezing of the patient between the thumbs and the fingers, resulting in movement both on the front and back. Though, it can be appreciated that the two sensor configuration may also be effective when using the two finger technique, particularly when the patient is held by a rescuer or lying on a compressible surface.

By implementing a dual sensor approach in accordance with the present disclosure, the estimated chest compression depth may be compared with desired chest compression ranges (e.g., based on AHA/physician recommendations), and appropriate feedback and/or instructions can be provided to a rescuer via display 47, for example, as to the quality of chest compressions administered based on the comparison of estimated compression depth and desired compression ranges. Such feedback may include, for example, prompts that provide instruction(s) to the rescuer of whether to provide deeper or shallower compressions, or to maintain the current depth, or simply an indication of the current chest compression depth and rate (e.g., display of numerical values of chest compression depth and rate, or other visual indication such as one or more bar graphs or waveforms). Any appropriate prompts may be employed, such as audio prompts (e.g., voice/spoken cues, beeps of varying tone/pattern, etc.), visual (e.g., display screen with text, colors and/or graphics), tactile (e.g., vibrations), or prompts according to another suitable method.

Figure 8:
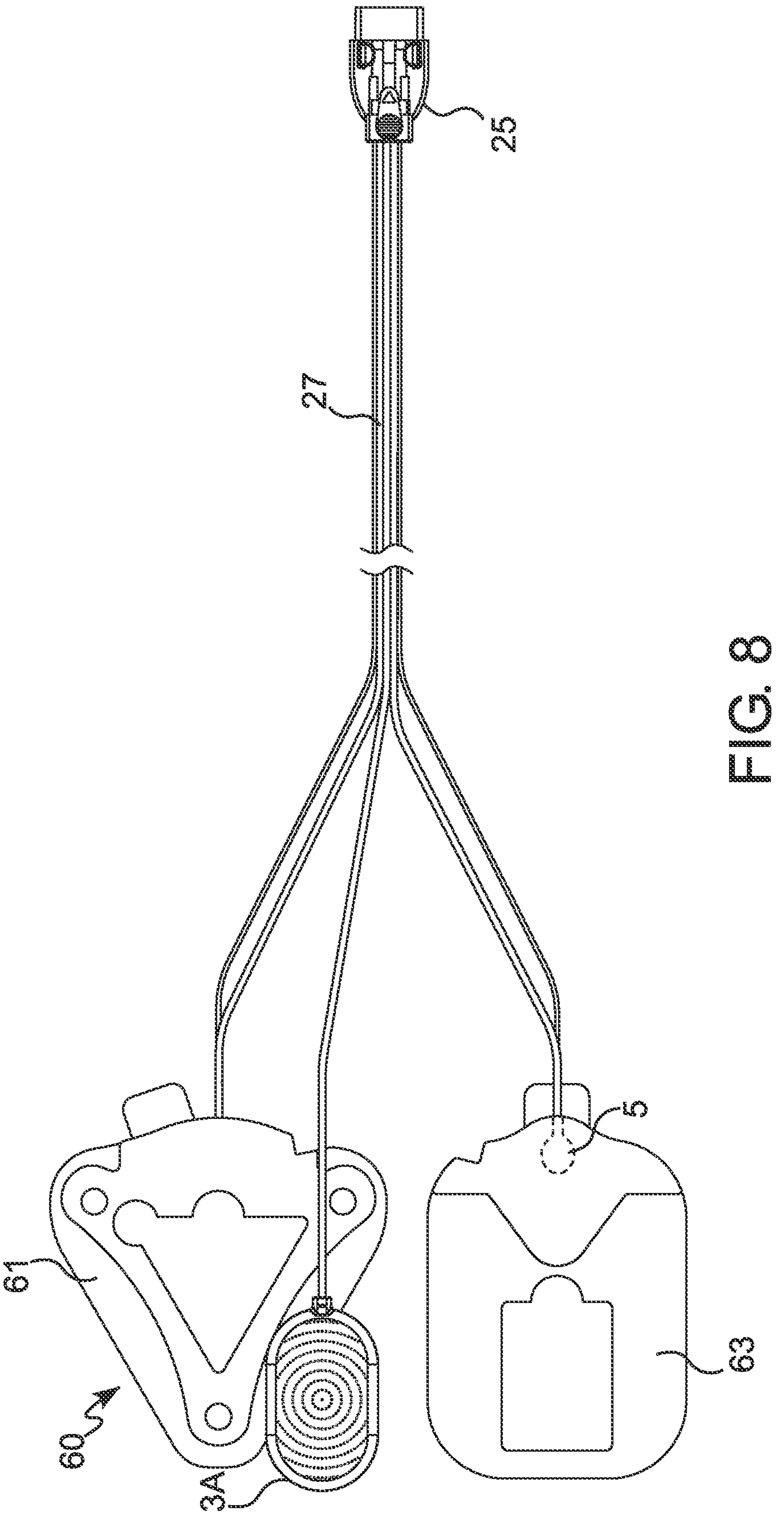
FIG. 8 is a top plan view of a resuscitation assembly for use with an adult patient in accordance with the present disclosure.

It should also be appreciated that while several of the embodiments described hereinabove may apply to pediatric or small patients, such configurations may also apply, or may be more preferable, for adult or larger patients. In addition, it should be understood that embodiments of a resuscitation assembly may employ other arrangements. For example, with reference to FIGS. 8 and 9, an alternative embodiment of resuscitation assembly 60 intended for use on adult patients is illustrated. In this example, the resuscitation assembly 60 comprises a first electrode assembly 61 associated with a first motion sensor 3A and a second electrode assembly 63 associated with the second motion sensor 5. The first electrode assembly 61 may be placed at an anterior position (e.g., over the sternum) of the patient and the second electrode assembly 63 may be placed on a posterior position (e.g., on the back, opposite the anterior placed electrode) of the patient, i.e., in an A-P position.

Figure 9A:
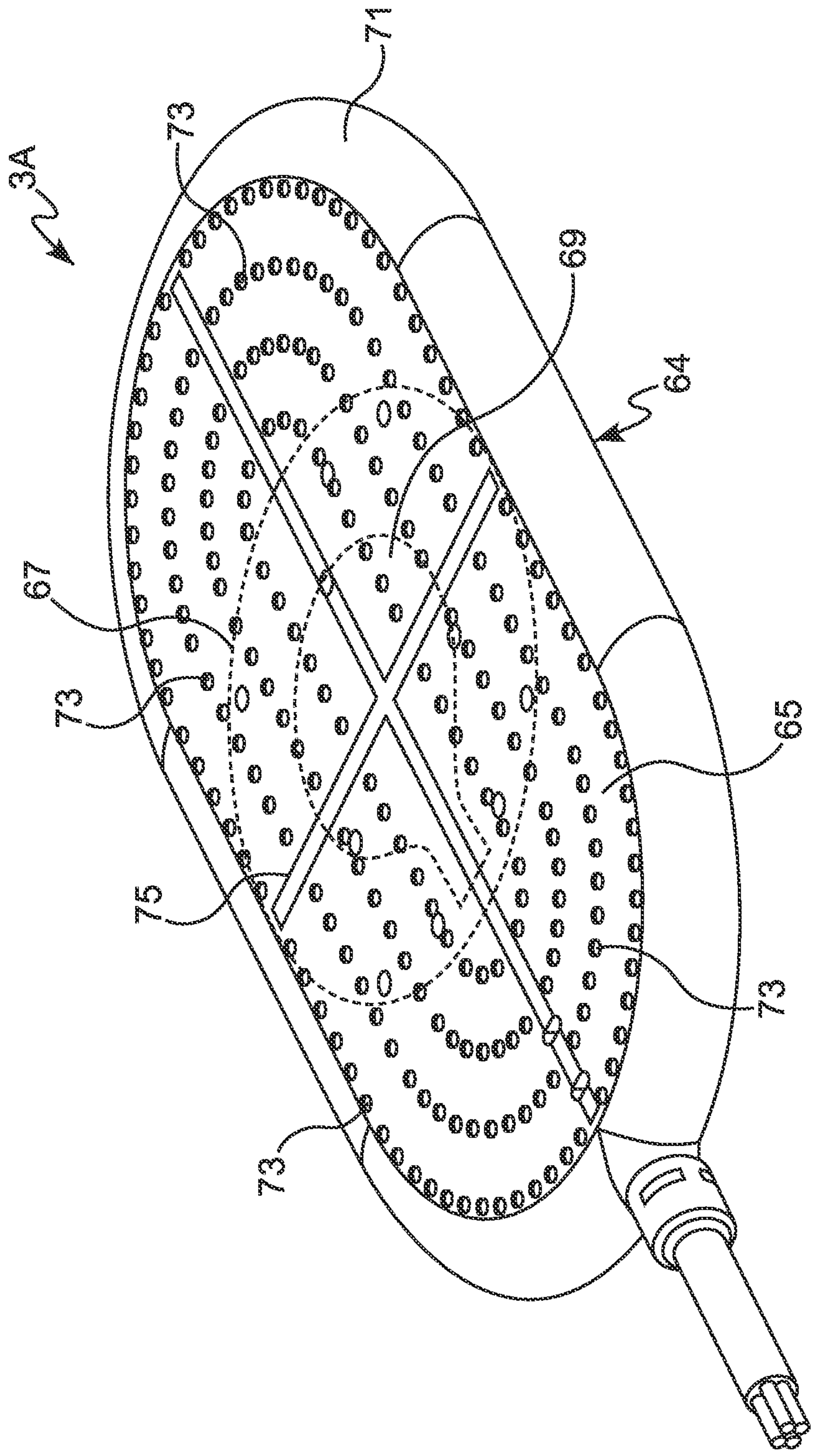
FIG. 9A is a perspective view of one example of textured padding for use with a motion sensor of the resuscitation assembly of FIG. 8.
Figure 9B:
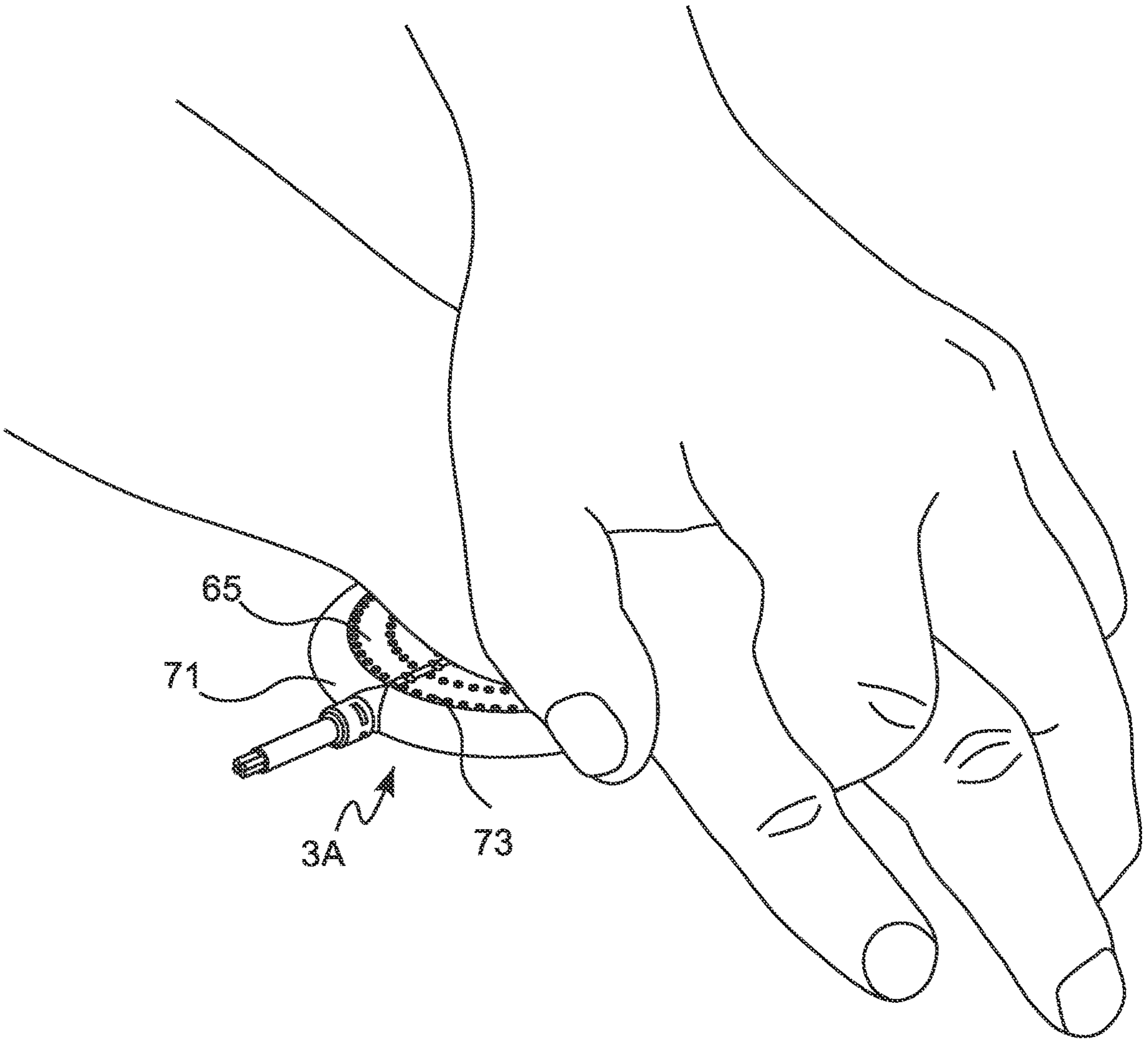
FIG. 9B is a perspective view of the textured padding of FIG. 9A illustrating a rescuer performing CPR compressions.

With specific reference to the illustrative embodiment of FIGS. 9A and 9B, the first motion sensor 3A is similar to the first motion sensor 3 except for the size and shape of textured padding 65, which is relatively larger and oval-shaped in this particular example. More specifically, the first motion sensor 3A is encapsulated within a first housing 64 physically coupled with the first motion sensor 3A. The first housing 64 comprises: a first frame 67 for holding an accelerometer of the first motion sensor 3A within a first receptacle 69, and textured padding 65 for receiving at least a portion of at least one hand of the user (i.e., rescuer) during chest compressions. The textured padding 65 covers the first frame 67 and the first motion sensor 3A. In this embodiment, the textured padding 65 for an adult sensor is designed to have an oval shape with tapered edges 71 to minimize sore points from sharp edges that may contact the user's hands or patient's chest and because chest compressions on adults are typically performed applying force with the bottom of the palm (using the carpal bones on the thenar and hypothenar eminence) (see FIG. 9B). It may be preferable for the first frame 67 to provide a relatively rigid central portion so that compression depth may be accurately measured, yet the relatively flexible outer areas of the textured padding 65 which extend past the circular frame shape (provided by the oval shape) may be preferable so as to conform to the contours of different chest surfaces/topographies. Hence, the larger, oval shape textured padding is able to accommodate a larger surface area of contact (e.g., from the palm) better than that of a smaller, more circular shape. The textured padding 65 may be made from a rubbery and semi-compliant material which will provide a comfortable surface to perform compressions onto yet it will also protect the first motion sensor 3A during the administration of chest compressions. Examples of such materials include thermoplastic elastomers, polyurethane, foam, rubber, silicone, and any other suitable materials.

As with the pediatric first motion sensor 3 described above, the textured padding 65 comprises an exterior having a plurality of raised surface features 73. Accordingly, the textured padding 65 is configured to provide tactile feedback for the user as to where the hands of the user are positioned or oriented relative to the first housing 64. In addition, the textured padding 65 is configured to provide a slip resistant surface that enhances comfort for the user when providing chest compressions to the patient. In one example, the plurality of raised surface 73 features comprise a plurality of protrusions extending outwardly from the exterior of the textured padding 65. With reference to FIG. 9, the plurality of protrusions may be arranged according to a concentric pattern. The arrangement of the protrusions in a concentric pattern provides both visual and tactile feedback to the user of the location at which the hands are to be positioned during chest compressions. In addition, the protrusions extend outwardly from the exterior of the textured padding 65 at a height that is tall enough to provide visual feedback to the user and short enough to mitigate damage to the user's hands during compression. In some examples, as shown in FIG. 9, a central region of the textured padding 65 may be designated by a cross-shaped marking 75 that serves to guide the user to properly place the first motion sensor 3A at a suitable anterior position over the sternum of the patient.

The first frame 67 may comprise a substantially circular shape and may be manufactured from a material that is substantially more rigid than the material used to form the textured padding. For example, the first frame 67 may comprise a polymeric material comprising at least one of: polycarbonate, polypropylene, polystyrene, polyethylene, ABS, nylon, silicone, elastomer, neoprene, santoprene, polyurethane, or any other suitable material. In various embodiments, the polymeric material has a Shore 00 durometer of between 60 and 100, a Shore A durometer of between 20 and 100, or a Shore D durometer of between 1 and 60, and/or a Young's modulus of between 1 MPa and 20 MPa so as to provide for a comfortable, slip resistant surface material. The textured padding 65 is configured to encapsulate the first frame 67 and the first motion sensor 3A in any suitable manner. For example, the textured padding may be over-molded onto the first frame 67 and the first motion sensor 3A. The textured padding 65 may have a similar or different material composition than the first frame 67. In certain embodiments, it may be preferable for the first frame 67 to be more rigid relative to the textured padding 65 so that the textured padding 65 provides a soft feel for the user while the first frame 67 provides underlying structure and rigidity for the overall sensor. The textured padding 65 may include one or more materials such as polycarbonate, polypropylene, polystyrene, polyethylene, ABS, nylon, silicone, elastomer, neoprene, santoprene, polyurethane, and/or another suitable material. The textured padding 65 may exhibit a Shore OO durometer of between 60 and 100 (e.g., between 70 and 90, between 75 and 90), a Shore A durometer of between 20 and 100 (e.g., between 20 and 50, between 25 and 45), or a Shore D durometer of between 1 and 60 (e.g., between 1 and 20, between 5 and 15, between 5 and 10), and/or a Young's modulus of between 1 MPa and 20 MPa (e.g., 1-10 MPa, 1-5 MPa, 1-2 MPa).

By making the first frame 67 from a material that is more rigid than the textured padding 65 and providing the first motion sensor 3A at the center of the textured padding, another mechanism is provided for allowing the user to self-center his/her hands over the first motion sensor 3A, or at least balanced on either side of the motion sensor, during application of chest compressions such that the most accurate measurements can be achieved. A reason for this configuration is that if the user positions his her/hand off of a central location, the chest compressions will be applied to an edge of the more rigid material of the first frame 67, thereby causing discomfort to the rescuers hand. This will help the user to move his/her hands to a central location.

Chest compressions depth and rate measurements during CPR have been made in the past using a single sensor, for example an accelerometer contained in a housing placed on the chest of the patient at an anterior position, typically above the sternum. In such methods, the measured acceleration into the chest is twice integrated to determine chest displacement which is used to assess depth and rate of compressions. An example of such a method is described in U.S. Pat. No. 9,125,793, entitled "System for determining depth of chest compressions during CPR," which is hereby incorporated by reference in its entirety. However, such measurements may contain error that cannot be accounted for, for example, error due to movement of a surface under the patient, patient motion and/or movement during transport, etc. As one example, if the patient is lying on a soft compressible surface, such as a mattress, the measured displacement will include not only the compression into the chest but also the depth of the deformation of the compressible surface. This can lead to an overestimation of compression depth. As another example, if the patient is in a moving ambulance the outside motion may further affect the compression measurements and contribute to error in estimating compression depth.

The systems of the present disclosure may be utilized to provide feedback to a user regarding resuscitation activities (e.g., chest compressions, ventilations) being performed on the patient by the rescuer with improved accuracy. More specifically, with reference to FIG. 10, and with continuing reference to FIGS. 8 and 9, in operation, a rescuer 80 may place the electrode assemblies 61 and 63 (located posteriorly and therefore not seen in FIG. 10) of the resuscitation assembly 60 in an A-P orientation, with the first electrode assembly 61 being positioned on the adult patient's sternum and the second electrode assembly 63 being positioned on the patient's back. Alternatively, the electrode assemblies of the resuscitation assembly may be positioned on the patient in an A-A orientation. Specifically, in such a configuration, one electrode assembly is positioned on a right side of a chest of the patient 82 between the armpit and the sternum, with the portion of the electrode assembly comprising the motion sensor place substantially above the sternum. The other resuscitation assembly is an apex electrode assembly and is positioned on a left side of the chest of the patient 82 over lower ribs of the patient 82. In either configuration, the motion sensors of the electrode assemblies may be provided as three-axis accelerometers as described hereinabove such that acceleration in the x, y, and z directions is measured simultaneously with each of two sensors incorporated within respective electrode assemblies.

Once the electrode assemblies 61, 63 included with the resuscitation assembly 60 of the present disclosure are properly placed, they are operatively connected to a defibrillator 45 having control circuitry (not shown) and an output device, such as display 47 and/or a speaker (not shown), to provide output to a user. Such assemblies may be connected via cables 27, or alternatively one or more of the motion sensors may be operatively coupled to the defibrillator and/or other devices using wireless technology (e.g. Bluetooth, WiFi, radio frequency, near field communication, etc.). The control circuitry used in the defibrillator 45 may be any suitable computer control system, and may be disposed within the housing of the defibrillator. Alternatively, the control circuitry may be disposed within an associated defibrillator, within an associated mechanical chest compression device, or it may be a general purpose computer or a dedicated single purpose computer. The control circuitry may comprise at least one processor and at least one memory including program code stored on the memory, where the computer program code is configured such that, with the at least one processor, when run on the processor, it causes the processor to perform the functions assigned to the control circuitry throughout this disclosure. These functions include interpreting the signals from the motion sensors 3A, 5, and/or signals produced by other sensors, to determine compression depth, and produce signals indicative of the calculated compression depth, and operate outputs such as speakers or displays to provide feedback to a rescuer.

In one example, the output device of the defibrillator 45 provides information about patient status and CPR administration quality during the use of the defibrillator 45. The data is collected and displayed in an efficient and effective manner to a rescuer. For example, during the administration of chest compressions, the output device may display on display 47 information about the chest compressions.

The information about the chest compressions may be automatically displayed in display 47 when compressions are detected. The information about the chest compressions displayed may include indications for estimated values of rate 110 (e.g., number of compressions per minute) and depth 112 (e.g., depth of compressions in inches or millimeters). Information about chest compressions displayed on display 47 may also include an intuitive indication of the quality of chest compressions, for example, a perfusion performance indicator (PPI) 114. The PPI 114 may be provided as a graphical indicator, such as a shape (e.g., a diamond) that fills according to whether the rate and/or depth of compressions are within target range(s), to provide feedback regarding both the rate and depth of compression. The entire indicator is filled when compressions are performed at a particular target range for rate (100-120 CPM) and the depth of compressions falls within 2.0-2.4 inches. As the velocity and/or depth decreases below the acceptable limit, the amount that is filled decreases. The PPI 114 provides a visual indication of the quality of the CPR so that the rescuer can aim to keep the PPI 114 fully filled. That is, the rate and depth of compressions may be provided as inputs for whether the graphical PPI 114 fills, indicating that the overall quality of compressions at that particular moment is acceptable. The rate and depth of compressions can be determined by analyzing readings from the motion sensors 3A, 5. Displaying the actual rate and depth data (in addition to or instead of an indication of whether the values are within or outside of an acceptable range) is believed to provide useful feedback to the rescuer. For example, if an acceptable range for chest compression depth is between 2.0-2.4 inches, providing the rescuer with an indication that his/her compressions are only 0.5 inches, can allow the rescuer to determine how to correctly modify his/her administration of the chest compressions.

More specifically, the control circuitry of the defibrillator 45 is operatively connected to and programmed to receive and process signals from the motion sensors 3A, 5 of the electrode assemblies 61 and 63 to determine whether at least one of a chest compression depth and rate during administration of CPR falls within a desired range. The output device of the defibrillator 45 then provides feedback instructions to the user to maintain the chest compression depth and rate during CPR within the desired range.

Figure 10:
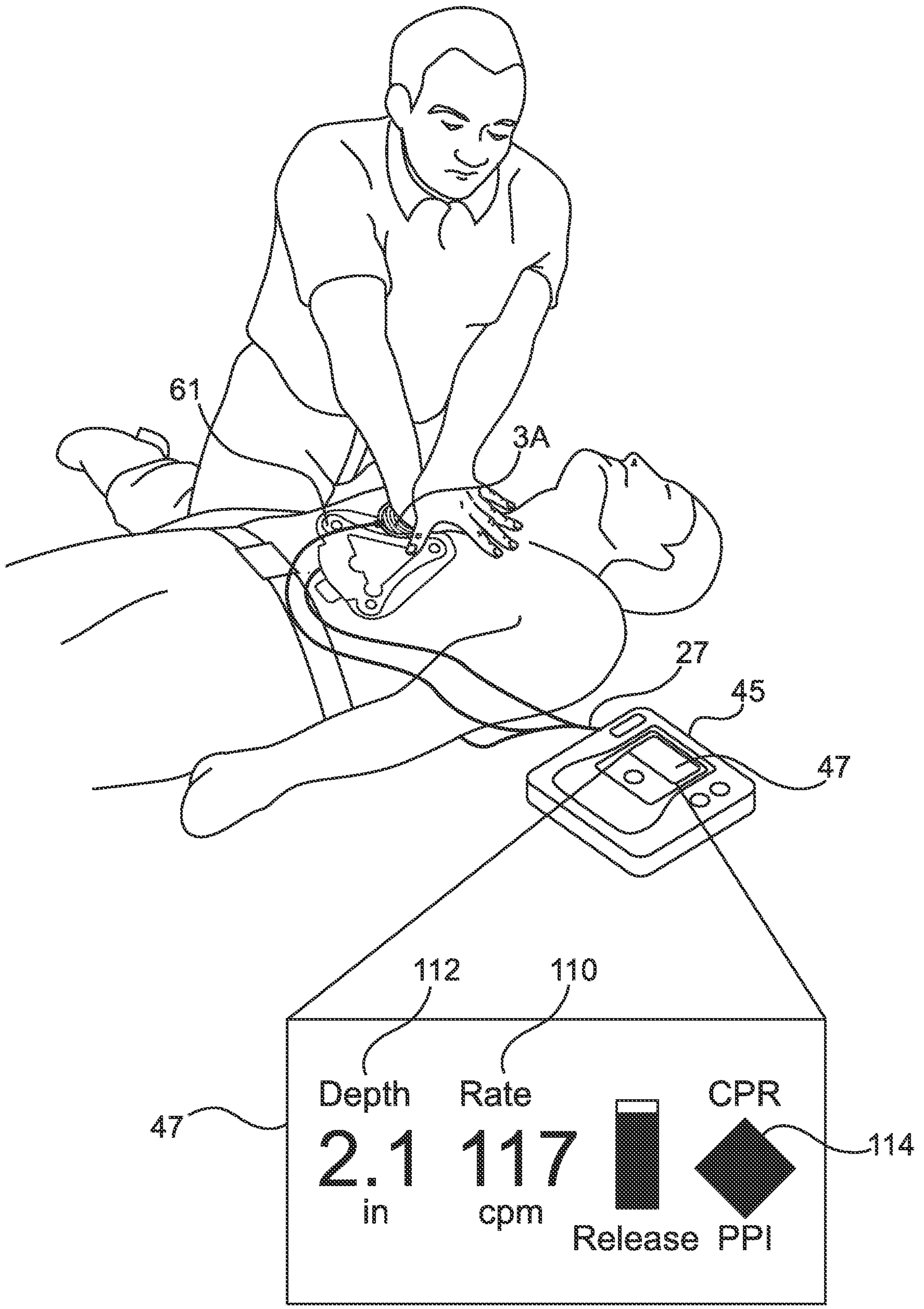
FIG. 10 illustrates a rescuer performing CPR compressions on an adult patient utilizing a resuscitation assembly in accordance with some embodiments.

With the electrode assemblies 61 and 63 positioned in an anterior-posterior position as shown in FIG. 10, in one example, the chest compression depth is calculated by subtracting a distance traveled by the motion sensor 5 of the second electrode assembly 63 from a distance traveled by the motion sensor 3A of the first electrode assembly 61. Additional details on the manner in which chest compression depth is calculated is found in U.S. Pat. No. 10,406,345. In addition, along with compression depth, other parameters may be calculated using information obtained from the motion sensors 3A, 5. For example, based on the motion signals recorded from the motion sensors of the electrode assemblies of the resuscitation assembly of the present disclosure, processing circuitry in a system for providing resuscitation assistance may receive and process the recorded data to determine: 1) whether a patient is being transported; 2) the overall orientation of the patient; 3) whether the electrode assemblies are provided in A-A orientation or an A-P orientation; 4) the type of surface upon which a patient is placed; and 5) a rate of ventilations for a patient. Additional details of the manner in which the processing circuitry performs such calculations is provided in disclosed in U.S. Pat. No. 10,406,345.

Figure 11A:
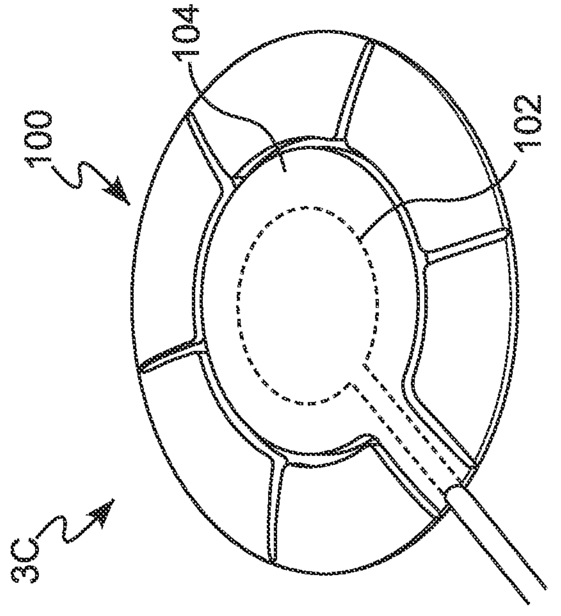
FIGS. 11A-11C are perspective views of another example of a motion sensor for use with a system for assisting a user in providing chest compressions to a patient in accordance with the present disclosure.
Figure 11B:
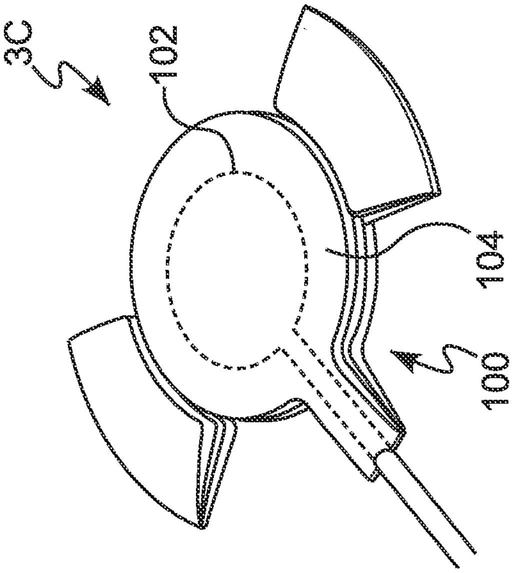
Figure 11C:
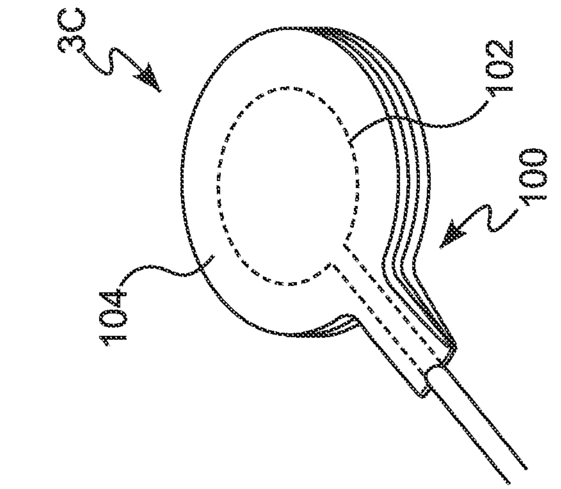

With reference to FIGS. 11A-11C, another example of a motion sensor 3C for use with the systems and assemblies disclosed herein. Motion sensor 3C is encapsulated within a housing 100 physically coupled with the first motion sensor 3C. The housing 100 comprises: a frame 102 for holding an accelerometer of the first motion sensor 3C within a receptacle, and segmented padding 104 for receiving at least a portion of at least one hand of the user (i.e., rescuer) during chest compressions. Motion sensor 3C is designed to both accommodate varying CPR techniques and sized to be comfortable to any user due to the segmented padding 104 providing customizable size and shape. The segmented padding 104 enables selection from different sizes and also for some different variations in shape to comfortably enable changes in CPR techniques. For example, the full-sized option (see FIG. 11A) could be used for palm compressions on pediatrics, an option with some segments removed (see FIG. 11B) could be used for two-thumbs with encircling hands technique, and the smallest option (see FIG. 11C) could be used for two finger technique, on very small pediatrics, or when space is very limited. In such an example, the segmented padding may be manufacture from a rubbery material, such as thermoplastic elastomer, such that the different segments could be torn off with ease.

As noted herein, it can be appreciated that other configurations of resuscitation assemblies may be employed. In some embodiments, an electrode assembly including an electrode pad and a motion sensor might not require the motion sensor to be directly attached to the electrode pad. For example, the motion sensor may be coupled to the electrode pad via a cable or some other extension that allows for an electrical connection to the overall system. Alternatively, the motion sensor may be completely free of mechanical attachment to the electrode pad. For instance, the motion sensor may be in wireless communication with the defibrillator or another computing device and be configured to be coupled to the body in any suitable manner (e.g., adhesively attached). In addition, the motion sensors described herein may be provided with a memory that stores data from time of activation. For example, the motion sensors may be provided with a removable tab to activate the sensor to begin storing data in the memory. In addition, the motion sensors may be provided with an audible/visual output system to provide a light to indicate that the system is active or a chest compression metronome to guide the rescuer in providing chest compressions. Once the motion sensor is paired to a device (for example a defibrillator, a desktop top computer, a table computer, a mobile phone, a patient monitor, etc.), the data stored in the memory of the motion sensor is transmitted to the device and integrated in a case record for post-case review. In certain examples, the motion sensors may be wireless with an option for wired communication with a device for real-time feedback. Alternatively, communication between the motion sensors and the device may be exclusively wireless.

It is common for a patient to be lying on a substantially rigid surface (e.g., a floor, gurney, backboard) prior to initiating chest compressions. However, if the patient is not on such a surface and is instead on a compressible surface (e.g., adults in hospitals are commonly treated on compressible surfaces, and mattresses for pediatric patients mattress can be especially compressible, even more so than adult mattresses), such as a soft mattress, the rescuer may need to perform more intense work to achieve the required compression depth. As a result, the rescuer may either have difficulty achieving sufficient compression depth and/or fatigue quickly. Or, without the feedback mechanism, the rescuer may have the impression of reaching a sufficient depth without actually achieving it when the whole body of the patient is moving downward with the compressible surface.

Figure 13:
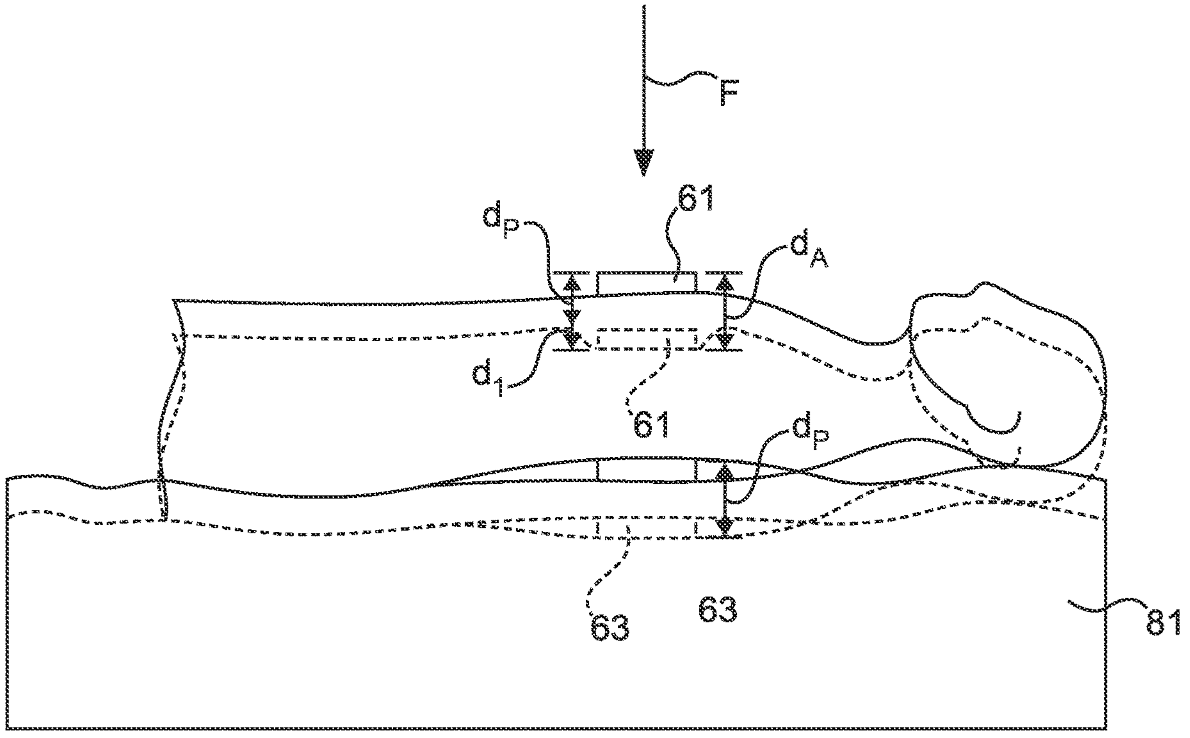
FIG. 13 is a side schematic view of compressions being applied to a patient utilizing a resuscitation assembly in accordance with some embodiments.

With reference to FIG. 13, a patient is illustrated as being positioned on a compressible surface 81, such as a mattress, where an electrode assembly 61 having a motion sensor 3 is positioned anteriorly and an electrode assembly 63 having a motion sensor 5 is positioned posteriorly. In operation, chest compressions are performed on the patient by a rescuer as denoted by arrow F. The measured displacement ($d_A$)

obtained by motion sensor 3 of electrode assembly 61 includes not only the displacement of the compression into the chest ($d_1$) but also the displacement caused by deformation of the compressible surface ($d_P$). As discussed hereinabove, this can lead to an overestimation of compression depth. By providing a motion sensor in both the anteriorly positioned electrode assembly 61 and the posteriorly positioned electrode assembly 63, this overestimation of the compression depth may be corrected to provide a more accurate determination of chest compression depth. The actual compression depth can be calculated by subtracting the displacement of the motion sensor 5 of the electrode assembly 63 (i.e., the secondary sensor) from the displacement of the motion sensor 3 of the electrode assembly 61 (i.e., the primary sensor). More specifically, the displacement of the motion sensor 3 of the electrode assembly 61 corresponds to displacement $d_A$ in FIG. 13 and includes both the displacement of the compression into the chest ($d_1$) and the displacement caused by deformation of the compressible surface ($d_P$). The displacement of the motion sensor 5 of the electrode assembly 63 only measures the displacement caused by deformation of the compressible surface ($d_P$). Accordingly, by subtracting the displacement caused by deformation of the compressible surface ($d_P$) from the displacement of the motion sensor 3 of the electrode assembly 61 ($d_A=d_1+d_P$), the actual compression depth, corresponding to displacement of the compression into the chest ($d_1$) can be obtained.

Figure 14:
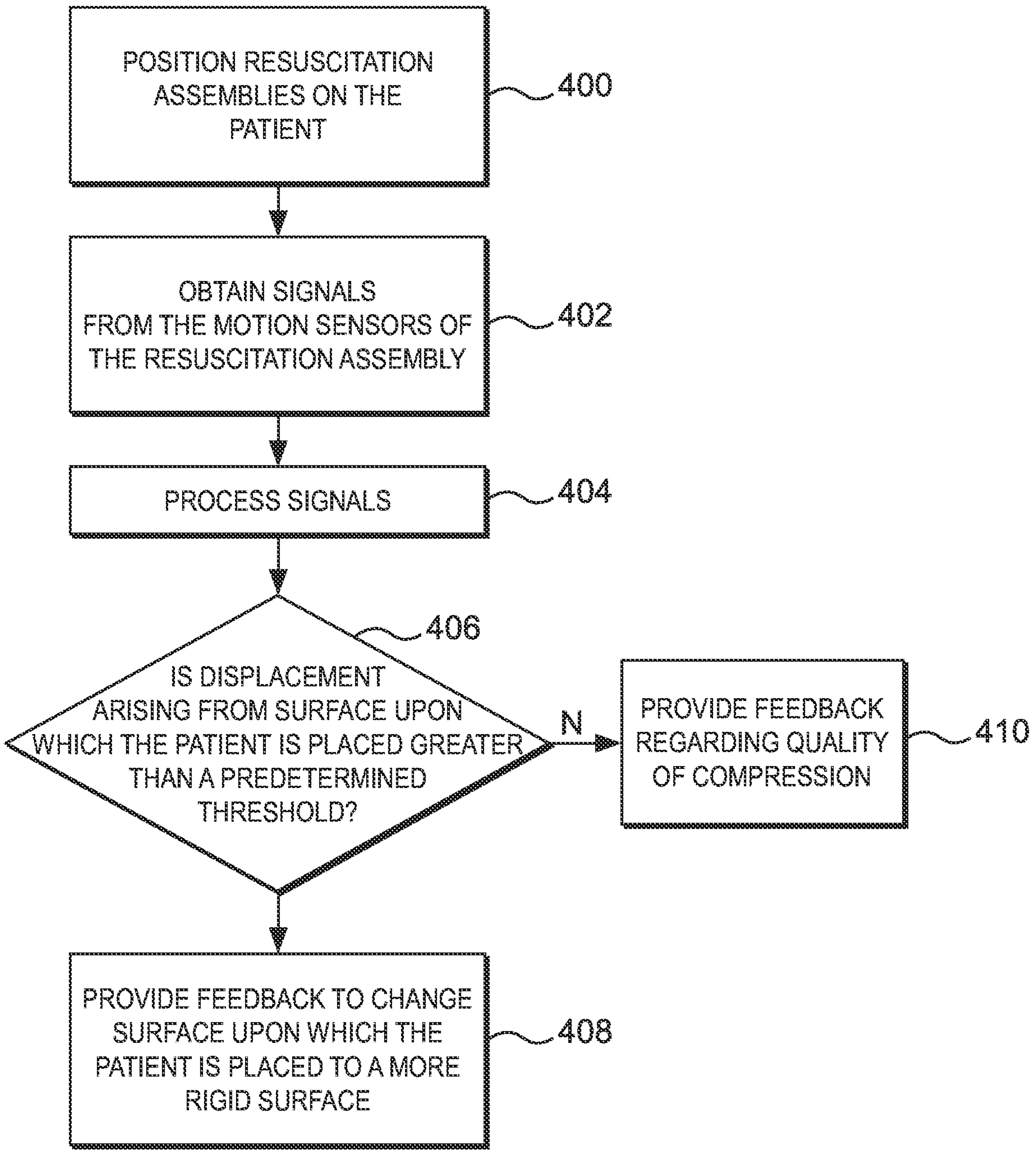
FIG. 14 is a flow chart of an exemplary process used for providing feedback to a rescuer regarding the surface upon which a patient is positioned in accordance with some embodiments.

In addition, with reference to FIG. 14, by incorporating a motion sensor 3, 5 in both the anteriorly positioned electrode assembly 61 and the posteriorly positioned electrode assembly 63, a motion sensor 3, 5 is provided on both the chest and back of the patient 3 (see block 400). The control circuitry of the defibrillator 45 is operatively connected to and programmed to receive and process signals from the motion sensors 3, 5 of the electrode assemblies 61 and 63 and may determine whether the patient is positioned on a compressible surface. More specifically, the motion sensor 3 of the electrode assembly 61 may produce a first signal representative of acceleration caused by compressions and the motion sensor 5 of the electrode assembly 63 may produce a second signal representative of other types of accelerations, such as acceleration due to movement on a compressible surface (see block 402). These signals are then processed (see block 404) to determine whether the amount of displacement arising from the compressible surface meets a threshold great enough to recommend that the surface underneath the patient be changed (see block 406). Such a threshold may be correlated to the amount of work that a rescuer would have to exert to achieve chest compressions that fall within a desired range. For example, to alleviate the rescuer of excess effort, a threshold may be set such that if the displacement arising from the compressible surface is greater than 10% (e.g., between 10-100%), greater than 25% (e.g., between 25-100%), greater than 50% (e.g., between 50-100%), greater than 75%, or greater than 100% of the recommended compression depth or another metric (e.g., comparison to the total displacement of the anterior sensor), then the user may be provided with a suggestion or instruction that the underlying surface on which the patient resides be changed. Such an instruction may be for a backboard to be placed underneath the patient, or for the patient to be moved from the existing relatively soft surface to a harder surface. The output device of the defibrillator 45 may provide feedback instructions to a user for a surface upon which the patient is positioned to be changed if it is determined that the patient 3 is provided on a compressible surface that meets the set threshold (see block 408 of FIG. 14). This feedback can be real-time feedback in the form of an audible, visual or tactile indication requesting that the rescuer position a backboard beneath the patient or move the patient to a more rigid surface. Alternatively, the feedback may be issued at the end of the rescue sequence advising the rescuer to use a backboard in future CPR situations. In situations where displacement arising from a surface upon which the patient is placed is less than the predetermined threshold, the system assumes the patient is positioned on a rigid surface and the defibrillator 45 provides feedback to the rescuer regarding the quality of compressions (see block 410) as discussed hereinabove.

In still another example, the motion sensors 3A, 5 of resuscitation assemblies in accordance with the present disclosure may be used to determine whether the electrode assemblies are placed in an A-A, A-P or lateral-lateral position based on the orientation of the motion sensors 3A, 5 and/or distance relative to one another. Once the position of the electrode assemblies is determined, the system may adjust one or more resuscitation parameters, e.g., feedback and/or information provided to the rescuer.

Figure 15A:
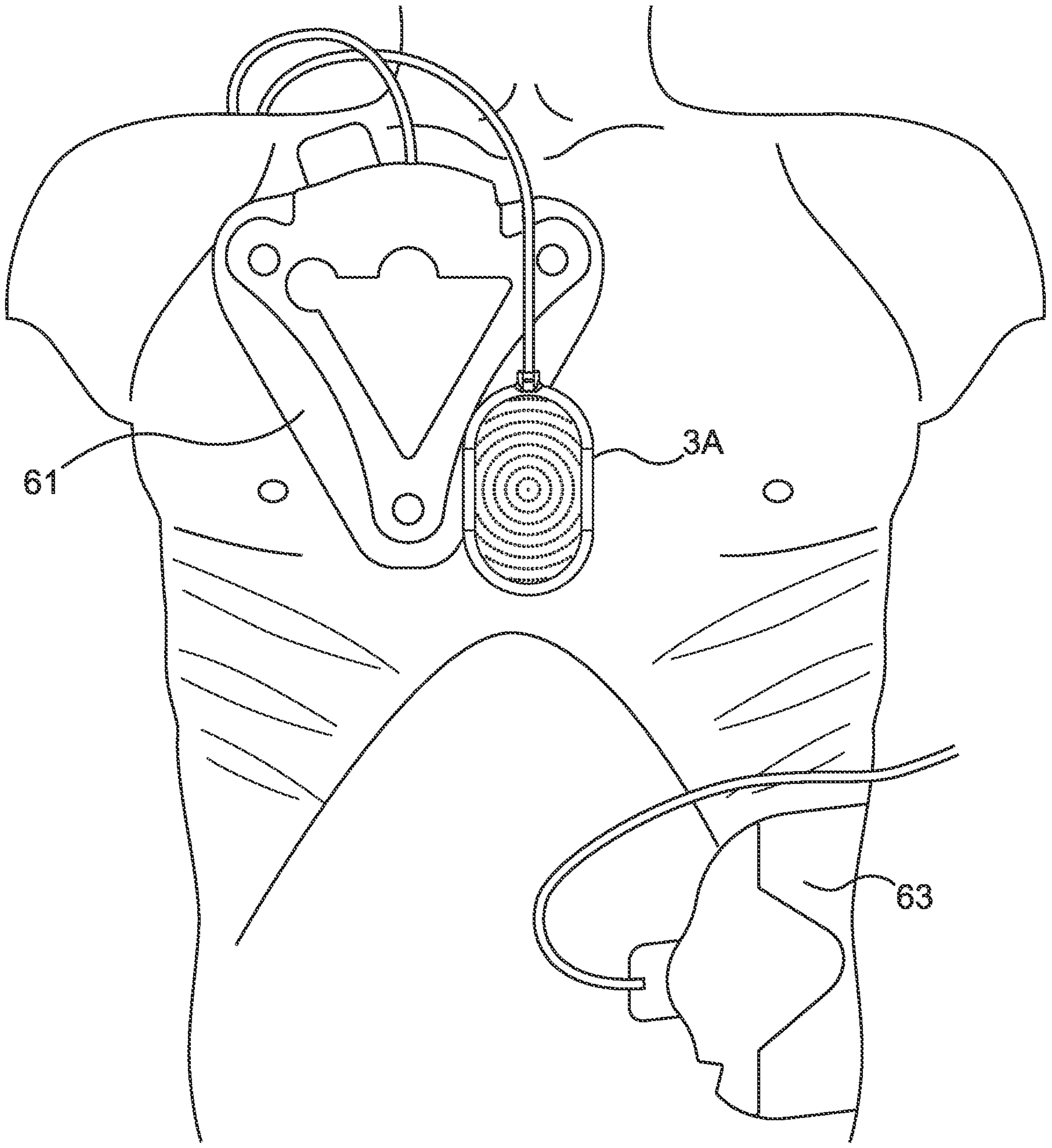
FIG. 15A illustrates placement of an example of a resuscitation assembly in accordance with the present disclosure on a cardiac arrest victim.

With reference to FIG. 15A, the resuscitation assembly comprises a first electrode assembly 61, a second electrode assembly 63 having a motion sensor 5, and a motion sensor 3A configured as a CPR pad associated with the first electrode assembly 61. In various embodiments, each of the electrode assemblies 61, 63 may have a motion sensor 3A, 5 incorporated therewith (e.g., motion sensor may be embedded within a portion of the electrode assembly). Electrode assemblies 61, 63 may be placed in an A-A position with electrode assembly 61 positioned on an upper right side of a chest of the patient between the shoulder and the sternum and the electrode assembly 63 positioned on a lower left side of the chest of the patient over lower ribs of the patient.

Figure 15B:
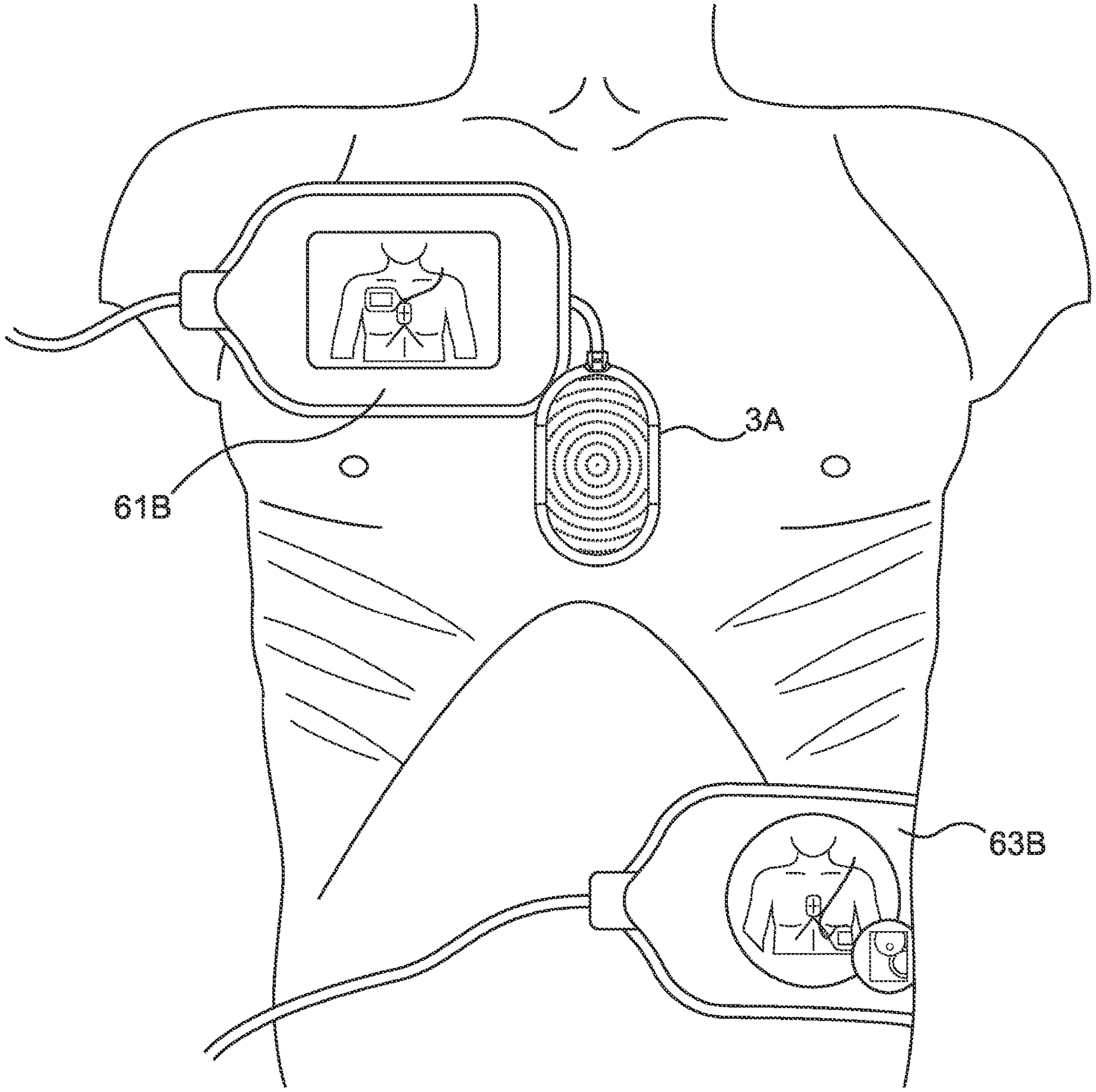
FIG. 15B illustrates placement of another example of a resuscitation assembly in accordance with the present disclosure on a cardiac arrest victim.

While various examples and configurations of the electrode assemblies incorporating motion sensors have been described hereinabove, this is not to be construed as limiting the present disclosure as various other examples and configurations have been envisioned in which each of the electrode assemblies includes at least one motion sensor. For instance, various other configurations have been envisioned for use with various patients. With reference to FIG. 15B, another example of a resuscitation assembly comprises a first electrode assembly 61B, a second electrode assembly 63B having a motion sensor 5, and a motion sensor 3A configured as a CPR pad associated with the first electrode assembly 61B. Electrode assemblies 61B, 63B may be placed in an A-A position with electrode assembly 61B positioned on an upper right side of a chest of the patient between the shoulder and the sternum and the electrode assembly 63B positioned on a lower left side of the chest of the patient over lower ribs of the patient.

Figure 16A:
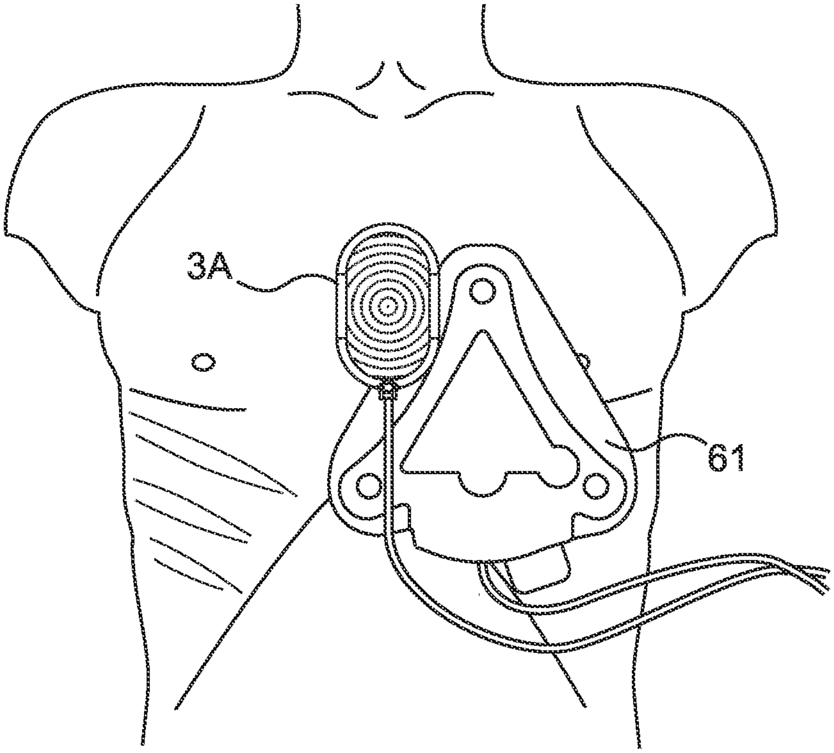
FIGS. 16A and 16B illustrate an alternative placement of the resuscitation assembly of FIG. 15A in accordance with the present disclosure on a cardiac arrest victim.
Figure 16B:
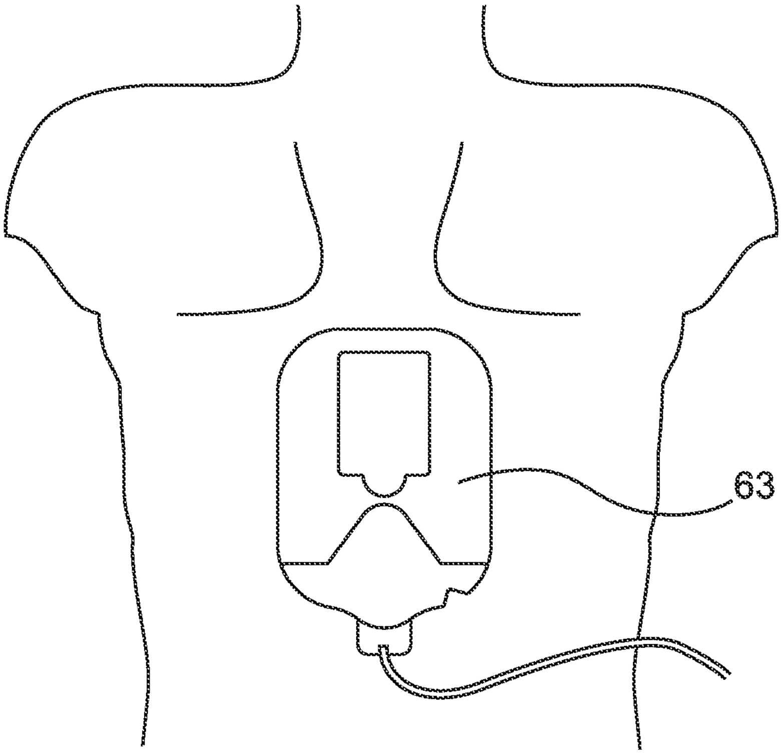

In certain forms of treatment, rather than placement in the A-A position shown in FIGS. 15A and 15B, a rescuer may place the first electrode assembly 61 and the second electrode assembly 63 in an A-P position. In some cases, placement of electrode assembly 61 on the patient's sternum area (as may happen during a rescue) and electrode assembly 63 on the patient's back may lead to an ECG signal that appears inverted and/or the pacing vector associated with the electrode placement may be oriented in an undesirable direction through the heart. In such instances, when electrode assemblies are placed in an A-P position as shown in FIGS. 16A and 16B, or other configuration that may lead to an inverted ECG signal and/or pacing vector oriented in an undesirable direction, the system may be configured to provide desirable corrections to the ECG signal and/or pacing vector to orient it in the preferred direction. Or, the system may prompt the rescuer to place the pads in an orientation that gives rise to a more intuitive ECG signal and/or pacing vector with preferred directionality.

By providing the electrode assemblies 61, 63 with motion sensors 3A, 5, the control circuitry used in the defibrillator 45 can be configured to determine the location of each of the electrode assemblies 61, 63 based on the orientation of the motion sensors 3A, 5 and/or distance relative to one another as described hereinabove. If the control circuitry determines that first electrode assembly 61 is positioned on the patient's sternum and the electrode assembly 63 on the patient's back as shown in FIGS. 16A and 16B based on the signals from the motion sensors 3A, 5, for some embodiments, the control circuit can invert or otherwise adjust the ECG signal such that it is displayed correctly on the display 47 of the defibrillator 45 and adjust the pacing vector (e.g., reverse the direction of the pacing vector) such that it is provided in the correct direction.

While various examples and configurations of the electrode assemblies incorporating motion sensors have been described hereinabove, this is not to be construed as limiting the present disclosure as various other examples and configurations have been envisioned in which each of the electrode assemblies includes at least one motion sensor. For instance, various other configurations have been envisioned for use with pediatric patients, infant patients, and adult patients as disclosed in U.S. Pat. No. 10,406,345.

Although a dual motion sensor resuscitation assembly having sensors with textured surfaces has been described in detail for the purpose of illustration based on what is currently considered to be the most practical examples, it is to be understood that such detail is solely for that purpose and that the subject matter provided herein is not limited to the disclosed examples, but, on the contrary, is intended to cover modifications and equivalent arrangements. For example, it is to be understood that this disclosure contemplates that, to the extent possible, one or more features of any example can be combined with one or more features of any other example.

As used herein, the singular form of "a", "an", and "the" include plural referents unless the context clearly dictates otherwise.

As used herein, the terms "right", "left", "top", and derivatives thereof shall relate to the subject matter provided herein as it is oriented in the drawing figures. However, it is to be understood that the subject matter provided herein can assume various alternative orientations and, accordingly, such terms are not to be considered as limiting. Also, it is to be understood that the subject matter provided herein can assume various alternative variations and stage sequences, except where expressly specified to the contrary. It is also to be understood that the specific devices and processes illustrated in the attached drawings, and described in the following specification, are examples. Hence, specific dimensions and other physical characteristics related to the embodiments disclosed herein are not to be considered as limiting.

What is claimed is:

1. A system for assisting a user in providing chest compressions to a patient, the system comprising:

a first electrode configured to measure ECG signals and provide defibrillation shock therapy to the patient;

a first motion sensor configured to be adhered to the first electrode at a position that is offset from a center of the first electrode and configured for measuring motion of an anterior portion of a thorax of the patient;

a first housing physically coupled with the first motion sensor and configured to receive at least a portion of at least one hand of the user during chest compressions, the first housing comprising:

a first frame comprising a base and a first receptacle extending from the base for holding the first motion sensor in place, the first receptacle comprising a substantially semicircular portion, a first leg extending at a first angle from a first end of the substantially semicircular portion toward an edge of the base, and a second leg extending at a second angle from a second end of the substantially semicircular portion toward the edge of the base such that the substantially semicircular portion, the first leg, and the second leg surround the first motion sensor and hold the first motion sensor in place, and a textured padding for receiving at least the portion of the at least one hand of the user during the chest compressions, the textured padding comprising:

an overmold encasing the base and the first receptacle of the first frame and the first motion sensor; and an exterior having a plurality of raised surface features, the first frame made from a first material having greater rigidity than a second material used to make the textured padding and configured to position the first motion sensor at a center region of the textured padding;

a second electrode configured to measure ECG signals and provide the defibrillation shock therapy to the patient in combination with the first electrode;

a second motion sensor configured to be adhered to the second electrode and configured for measuring motion of a posterior portion of the thorax of the patient; and a second housing physically coupled with the second motion sensor and comprising a second frame for holding the second motion sensor in place.

2. The system of claim 1, wherein the textured padding is configured to at least one of provide tactile feedback for the user as to where the hands of the user are positioned or oriented relative to the first housing and provide a slip resistant surface that enhances comfort for the user when providing chest compressions to the patient.

3. The system of claim 1, wherein the plurality of raised surface features comprise at least four protrusions extending outwardly from the exterior of the textured padding.

4. The system of claim 3, wherein the at least four protrusions are arranged according to a concentric pattern.

5. The system of claim 3, wherein the at least four protrusions cover an average area per protrusion of between about 0.0001 square inches and about 0.01 square inches.

6. The system of claim 1, wherein the first housing comprises a thermoplastic polymeric material comprising at least one of: polycarbonate, polypropylene, polystyrene, polyethylene, ABS, nylon, silicone, elastomer, neoprene, santoprene, or polyurethane.

7. The system of claim 6, wherein the thermoplastic polymeric material has a Shore OO durometer of between about 60 and about 100, a Shore A durometer of between about 20 and about 100, or a Shore D durometer of between about 1 and about 60.

8. The system of claim 1, wherein the textured padding comprises an upper surface and a lower surface with a thickness between the upper surface and the lower surface of between about 0.1 inches and about 2.5 inches.

9. The system of claim 1, wherein the textured padding comprises a substantially circular shape and the first frame comprises a substantially circular shape having a radius smaller than a radius of the textured padding.

10. The system of claim 9, wherein the radius of the textured padding is between about 0.5 inches and about 2.0 inches.

11. The system of claim 1, wherein the second frame comprises a second receptacle for receiving the second motion sensor, and wherein a first adhesive material is located within the first receptacle for adhering the first motion sensor and the first frame, and a second adhesive material is located within the second receptacle for adhering the second motion sensor and the second frame.

12. The system of claim 11, further comprising a connector and a cable for providing electrical communication between the first and second motion sensors and a computing device, wherein the first receptacle is configured to receive a first portion of the cable, and the second receptacle is configured to receive a second portion of the cable.

13. The system of claim 1, wherein the first motion sensor comprises a first accelerometer and the second motion sensor comprises a second accelerometer.

14. The system of claim 1, further comprising:

an output device configured to provide chest compression feedback for the user; and at least one processor and memory communicatively coupled with the first motion sensor and the second motion sensor, the at least one processor and memory configured to:

receive and process signals from the first motion sensor and the second motion sensor to estimate compression depth during administration of chest compressions by the user;

compare the estimated compression depth to a desired compression depth range; and cause the output device to provide an indication of the estimated compression depth and provide the chest compression feedback for the user.

15. The system of claim 1, wherein the textured padding comprises an oval shape and the first frame comprises a substantially circular shape.

16. A system for assisting a user in providing chest compressions to a patient, the system comprising:

a first electrode configured to measure ECG signals and provide defibrillation shock therapy to the patient;

a first motion sensor configured to be adhered to the first electrode at a position that is offset from a center of the first electrode and configured for measuring motion of an anterior portion of a thorax of the patient;

a first housing physically coupled with the first motion sensor and configured to receive at least a portion of at least one hand of the user during chest compressions, the first housing comprising:

a first frame comprising a base and a first receptacle extending from the base for holding the first motion sensor in place, the first receptacle comprising a substantially semicircular portion, a first leg extending at a first angle from a first end of the substantially semicircular portion toward an edge of the base, and a second leg extending at a second angle from a second end of the substantially semicircular portion toward the edge of the base such that the substantially semicircular portion, the first leg, and the second leg surround the first motion sensor and hold the first motion sensor in place, and a padding for receiving at least the portion of the at least one hand of the user during the chest compressions, the padding comprising:

an overmold encasing the base and the first receptacle of the first frame and the first motion sensor;

an upper surface; and a lower surface with a thickness between the upper surface and the lower surface of between about 0.1 inches and about 2.5 inches, the first frame made from a first material having greater rigidity than a second material used to make the padding and configured to position the first motion sensor at a center region of the padding;

a second electrode configured to measure ECG signals and provide the defibrillation shock therapy to the patient in combination with the first electrode;

a second motion sensor configured to be adhered to the second electrode and configured for measuring motion of a posterior portion of the thorax of the patient; and a second housing physically coupled with the second motion sensor and comprising a second frame for holding the second motion sensor in place.

17. The system of claim 16, wherein the padding comprises a textured exterior having a plurality of protrusions extending from the textured exterior of the padding.

18. The system of claim 17, wherein the plurality of protrusions are arranged according to a concentric pattern.

19. The system of claim 16, wherein the padding comprises a substantially circular shape and the first frame comprises a substantially circular shape having a radius smaller than a radius of the padding.

20. The system of claim 19, wherein the radius of the padding is between about 0.5 inches and about 2.5 inches.

21. The system of claim 16, further comprising a connector and a cable for providing electrical communication between the first and second motion sensors and a computing device, wherein the second frame comprises a second receptacle for receiving the second motion sensor, and wherein the first receptacle is configured to receive a first portion of a cable, and the second receptacle is configured to receive a second portion of the cable.

22. The system of claim 21, further comprising a first adhesive material located within the first receptacle for adhering the first motion sensor and the first frame, and a second adhesive material located within the second receptacle for adhering the second motion sensor and the second frame.

23. The system of claim 16, wherein the first motion sensor comprises a first accelerometer and the second motion sensor comprises a second accelerometer.

24. The system of claim 16, further comprising:

an output device configured to provide chest compression feedback for the user; and at least one processor and memory communicatively coupled with the first motion sensor and the second motion sensor, the at least one processor and memory configured to:

receive and process signals from the first motion sensor and the second motion sensor to estimate compression depth during administration of chest compressions by the user;

compare the estimated compression depth to a desired compression depth range; and cause the output device to provide an indication of the estimated compression depth and provide the chest compression feedback for the user.

25. The system of claim 16, wherein the padding comprises an oval shape and the first frame comprises a substantially circular shape.

26. The system of claim 1, wherein the base of the first frame provides a rigid central portion configured to enable accurate measures of compression depth and is surrounded by flexible outer areas of the textured padding which are configured to conform to differing surface topographies of the anterior portion of the thorax of the patient.

27. The system of claim 16, wherein the base of the first frame provides a rigid central portion configured to enable accurate measures of compression depth and is surrounded by flexible outer areas of the padding which are configured to conform to differing surface topographies of the anterior portion of the thorax of the patient.

* * * * *